(12) United States Patent
Yahata et al.

(10) Patent No.: US 7,493,016 B2
(45) Date of Patent: Feb. 17, 2009

(54) RECORDING DEVICE, PLAYBACK DEVICE AND PROGRAM

(75) Inventors: Hiroshi Yahata, Kadoma (JP); Tomoyuki Okada, Nara (JP); Wataru Ikeda, Osaka (JP)

(73) Assignee: Panasonic Corporation, Osaka (JP)

( * ) Notice: Subject to any disclaimer, the term of this patent is extended or adjusted under 35 U.S.C. 154(b) by 784 days.

(21) Appl. No.: 11/105,249

(22) Filed: Apr. 13, 2005

(65) Prior Publication Data
US 2005/0238326 A1  Oct. 27, 2005

(30) Foreign Application Priority Data
Apr. 15, 2004 (JP) .............................. 2004-120144
Jun. 2, 2004 (JP) .............................. 2004-164204

(51) Int. Cl.
*H04N 5/91* (2006.01)

(52) U.S. Cl. .............................. 386/68; 386/95; 386/125
(58) Field of Classification Search .................. 386/68, 386/95, 125
See application file for complete search history.

(56) References Cited
FOREIGN PATENT DOCUMENTS
WO   WO 03/065736   *   8/2003

* cited by examiner

*Primary Examiner*—Thai Tran
*Assistant Examiner*—Girumsew Wendmagegn

(57) ABSTRACT

After sizes of Intra pictures included in a digital stream are detected, an analysis unit 6 totals numbers of occurrences of the Intra pictures for each size to obtain an occurrence distribution of the sizes of the Intra pictures. Values "000b" to "111b" are respectively assigned to distribution ranges of the sizes of the Intra pictures. Then, an entry map, in which each Intra picture is represented by one of the values "001b" to "111b", are to be recorded onto a recording medium in association with the assignment information.

14 Claims, 24 Drawing Sheets

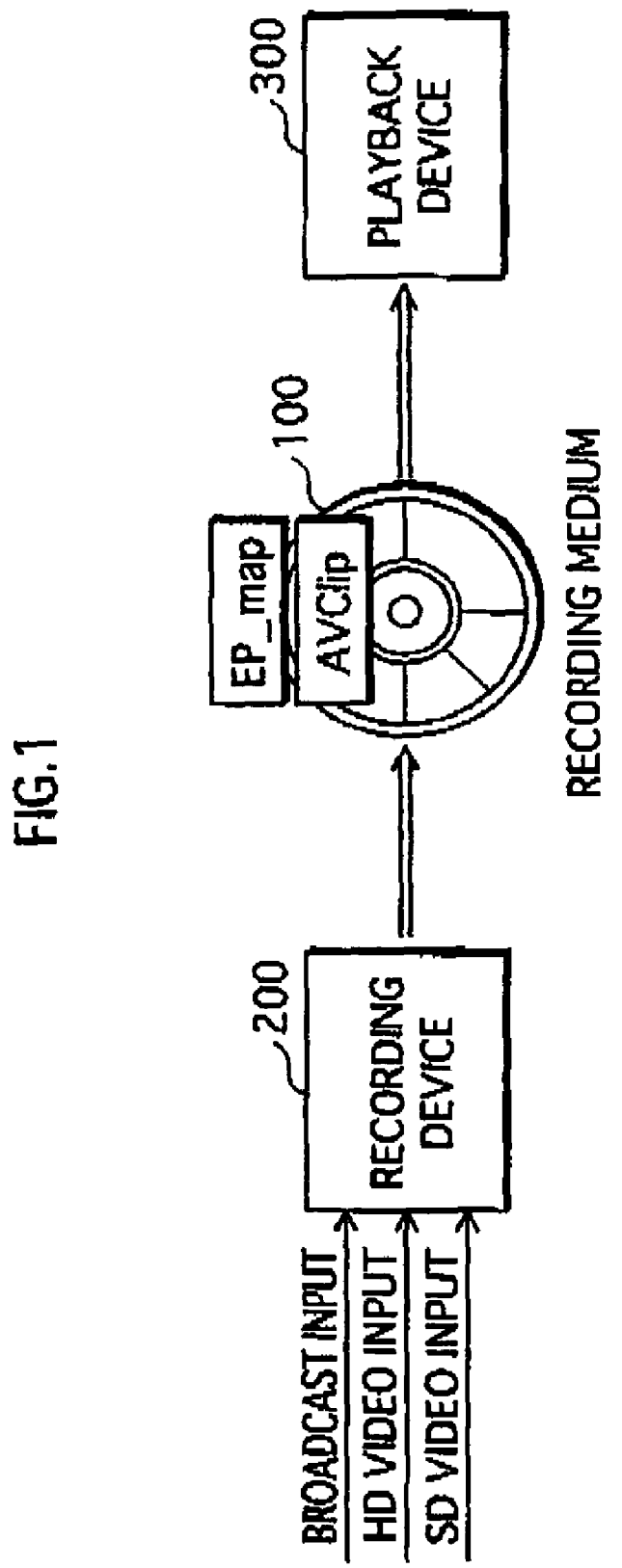

FIG.2A
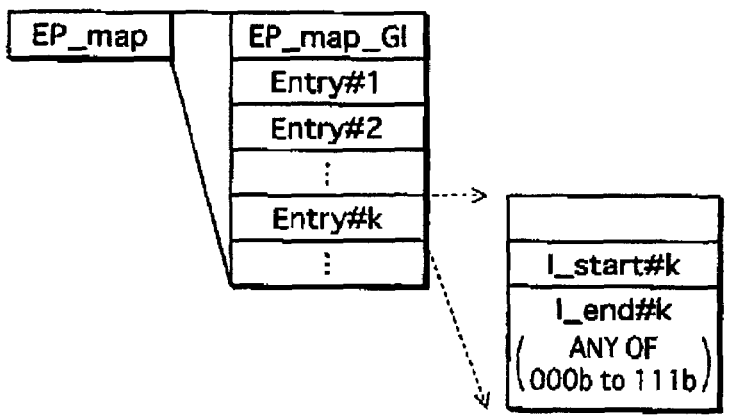
FIG.2B
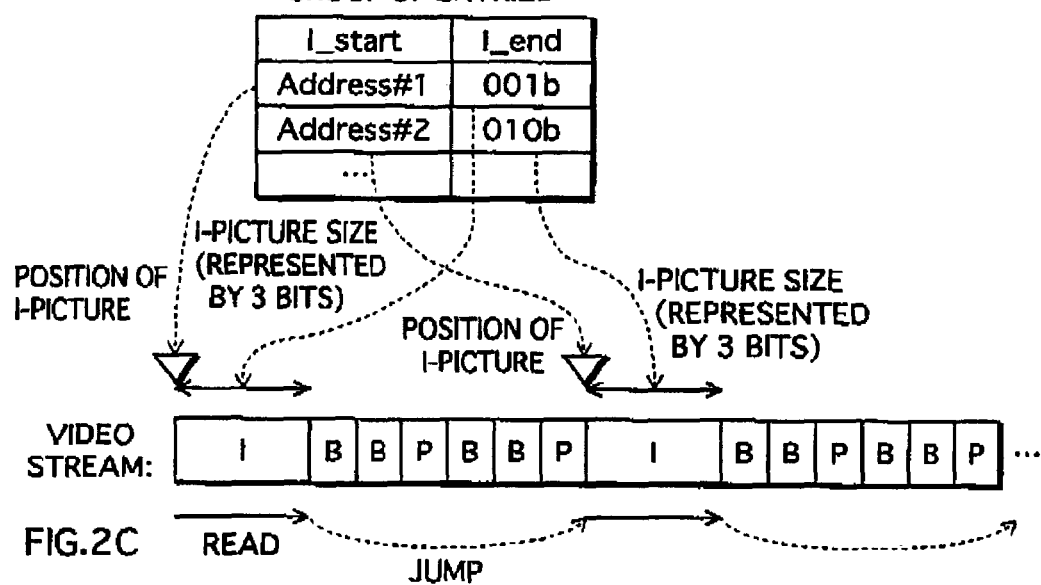
FIG.2C

FIG.3
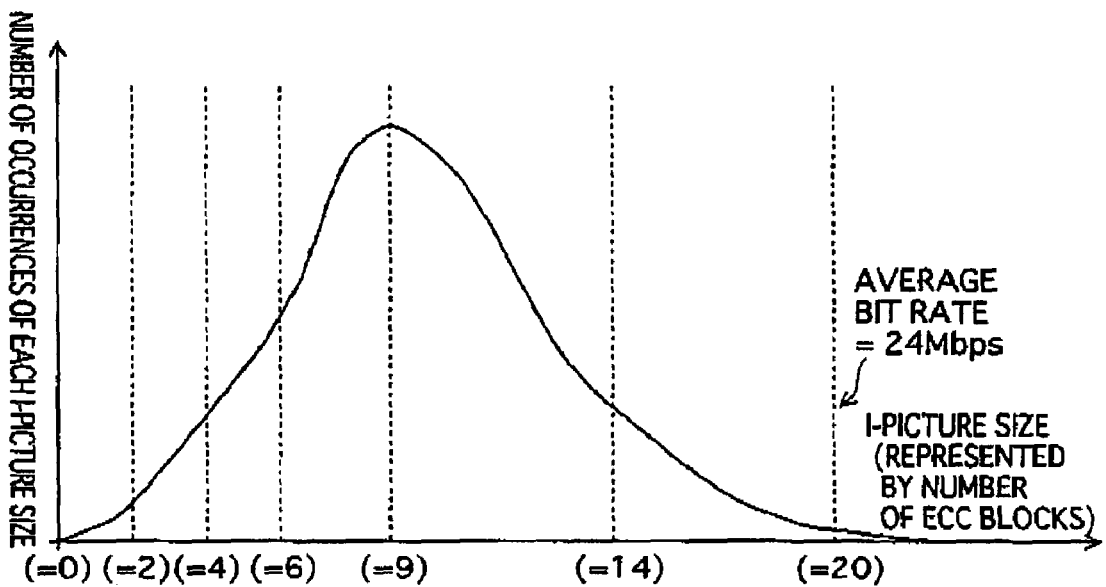
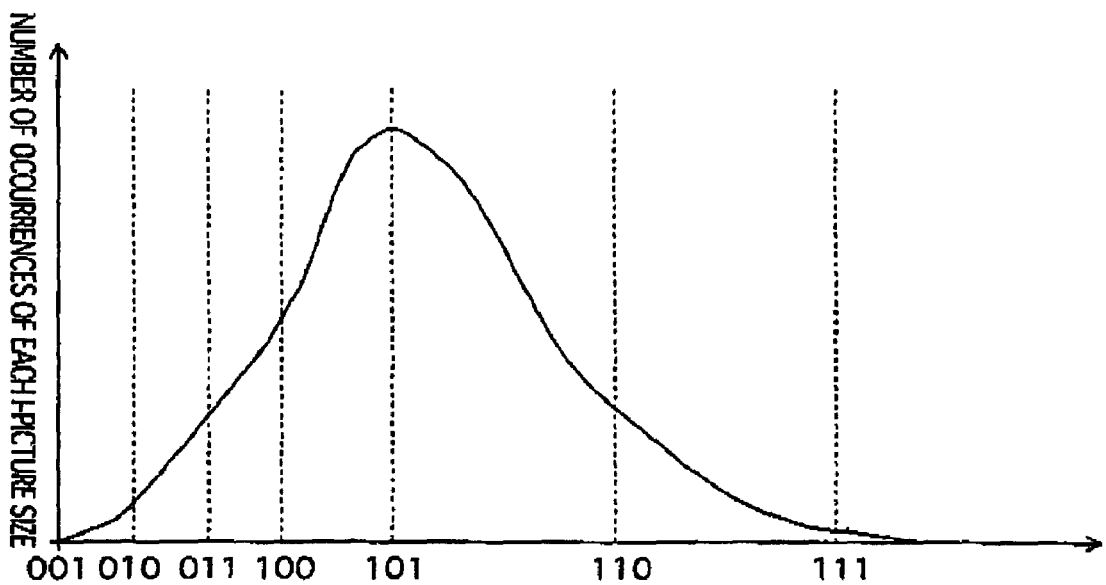

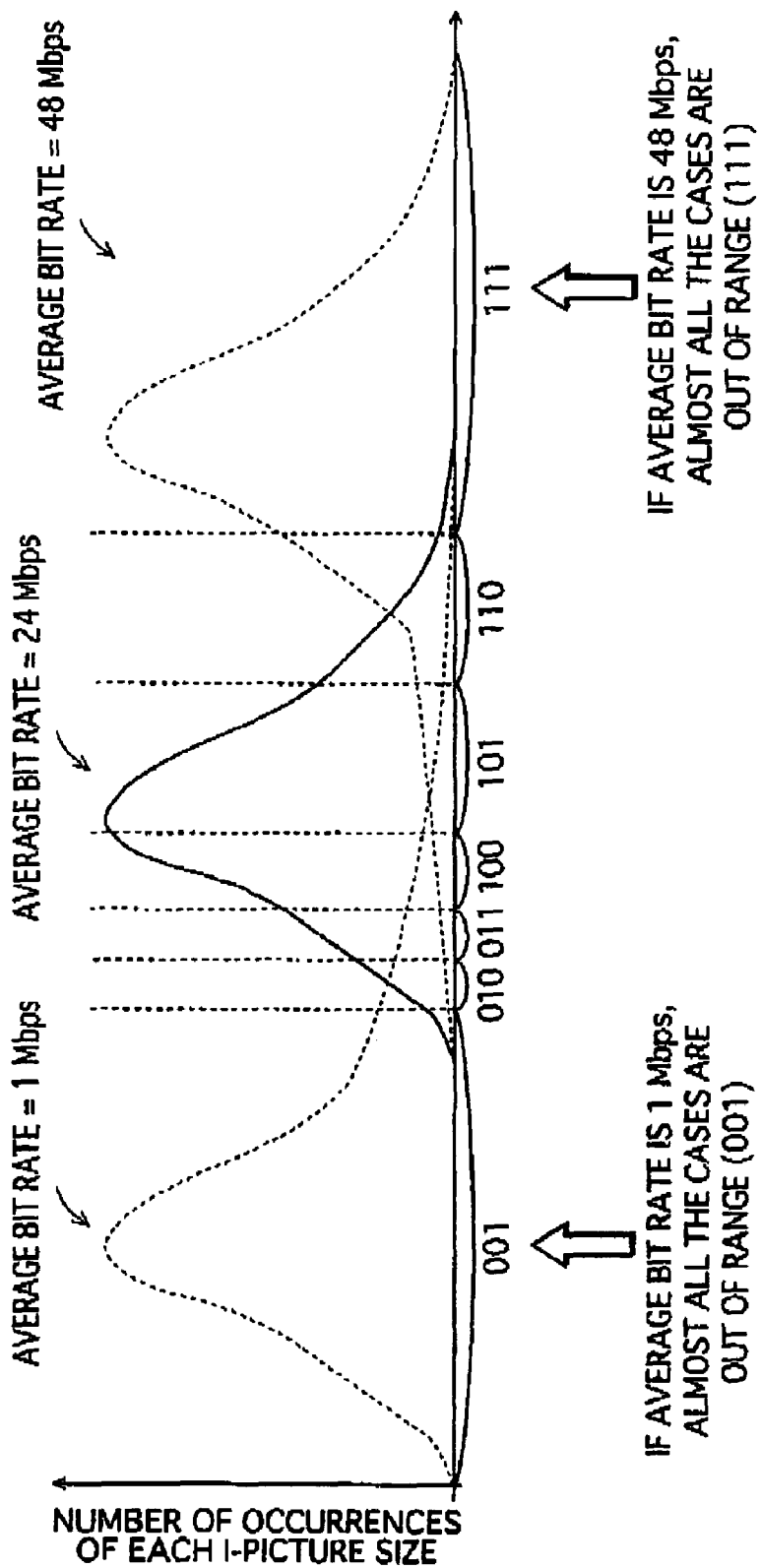

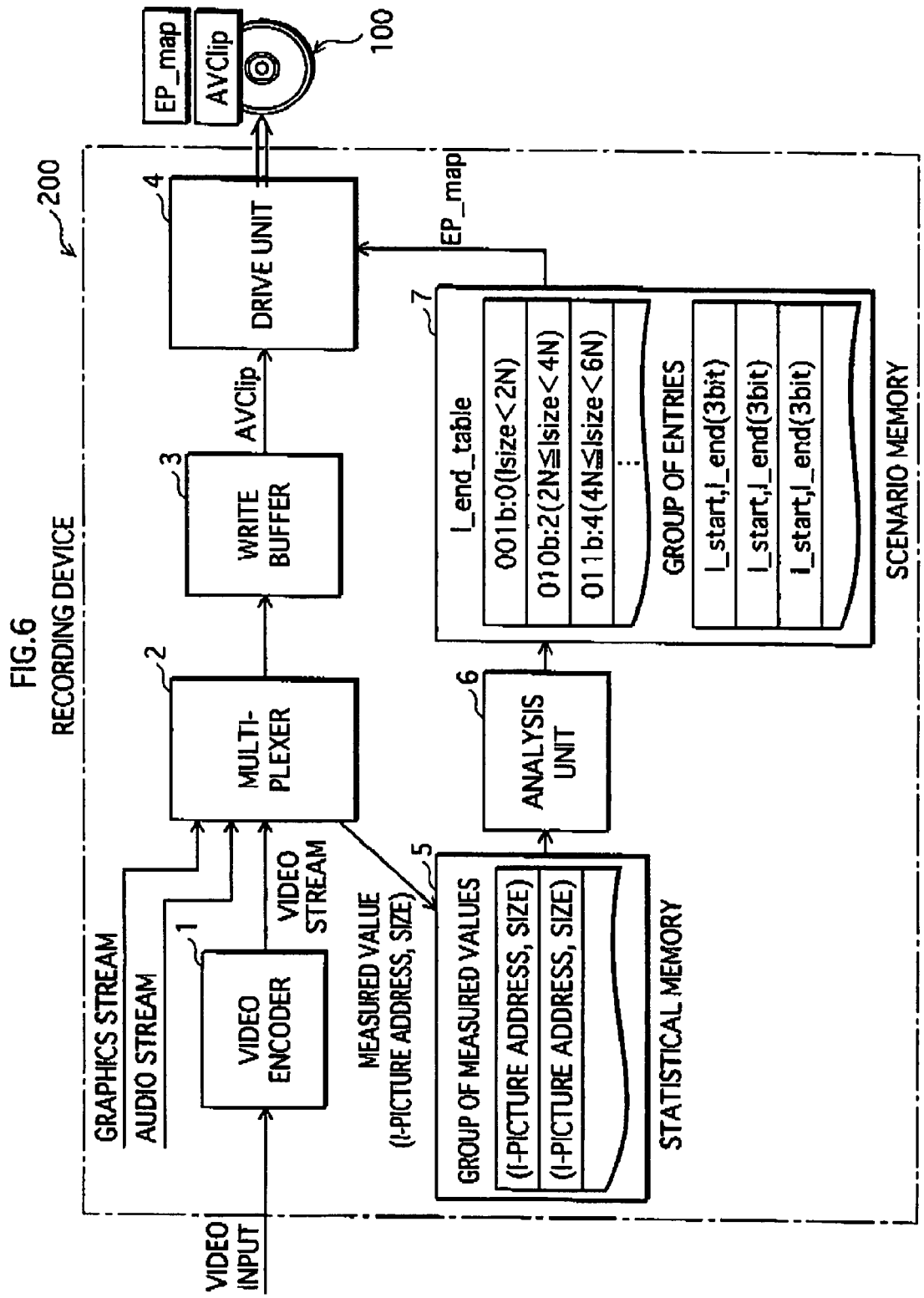

I-PICTURE IS ALIGNED
WITH ECC BLOCKS

NUMBER OF ECC BLOCKS = 2

I-PICTURE IS ALIGNED
WITH ECC BLOCKS

NUMBER OF ECC BLOCKS = 1

I-PICTURE IS NOT ALIGNED
WITH ECC BLOCKS

NUMBER OF ECC BLOCKS = I-PICTURE SIZE / ECC BLOCK SIZE +1
ADDITION "+1" MEANS THAT ONE EXTRA ECC BLOCK IS TO BE
INCLUDED IN THE COUNT TO READ SUFFICIENT ECC BLOCKS

| NUMBER OF ECC BLOCKS | NUMBER OF OCCURRENCES |
|---|---|
| 1 | 0 |
| 2 | 0 |
| 3 | 0 |
| 4 | 20 |
| 5 | 112 |
| 6 | 301 |
| 7 | 559 |
| 8 | 743 |
| 9 | 790 |
| 10 | 865 |
| 11 | 829 |
| 12 | 693 |
| 13 | 575 |
| 14 | 423 |
| 15 | 331 |
| 16 | 242 |

| NUMBER OF ECC BLOCKS | NUMBER OF OCCURRENCES |
|---|---|
| 17 | 184 |
| 18 | 159 |
| 19 | 134 |
| 20 | 87 |
| 21 | 45 |
| 22 | 41 |
| 23 | 29 |
| 24 | 21 |
| 25 | 0 |
| 26 | 0 |
| 27 | 3 |
| 28 | 0 |
| 29 | 0 |
| 30 | 1 |
| 31 | 0 |
| 32 | 0 |

PERFORM CLASSIFICATION SO THAT TOTAL OCCURENCE NUMBER IS AT THE SAME LEVEL IN EACH

| NUMBER OF ECC BLOCKS | NUMBER OF OCCURENCES | GROUP |
|---|---|---|
| 1~7 | 992 | Gr(1) |
| 8 | 743 | Gr(2) |
| 9 | 790 | Gr(3) |
| 10 | 865 | Gr(4) |
| 11 | 829 | Gr(5) |
| 12~13 | 1268 | Gr(6) |
| 14~16 | 996 | Gr(7) |
| 17~32 | 704 | Gr(8) |

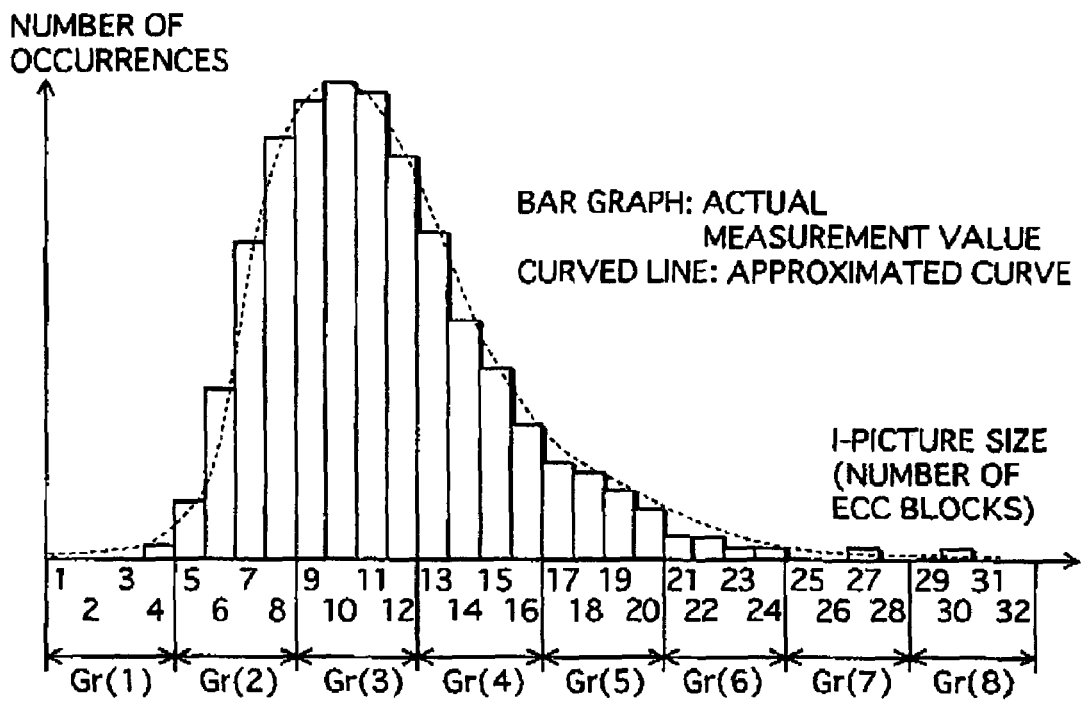

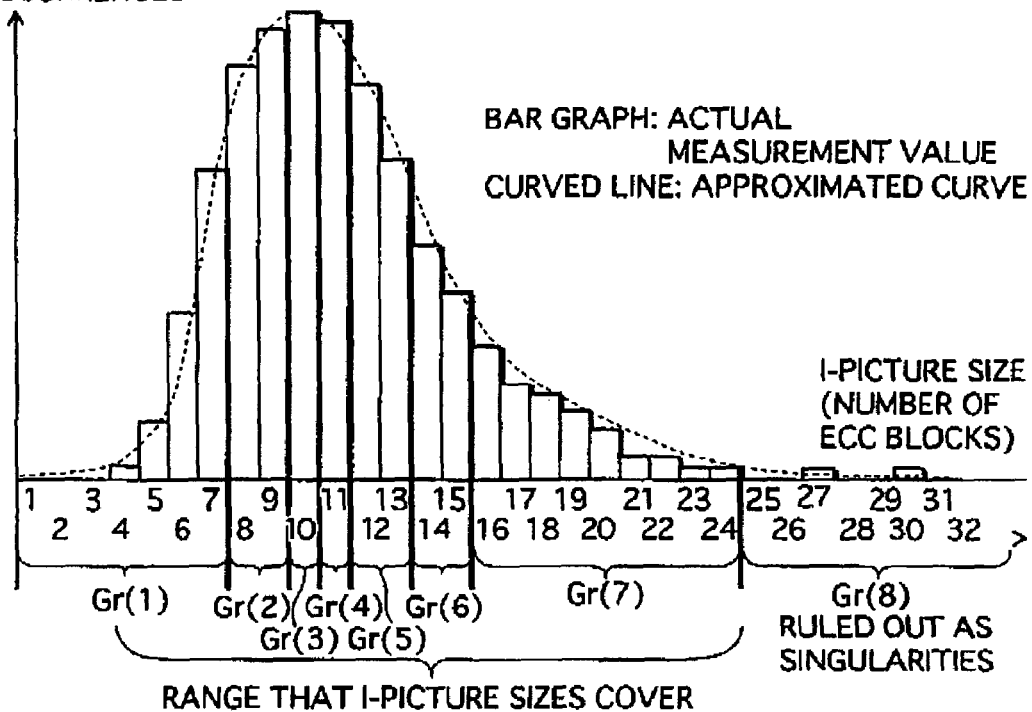

RANGE OF Gr(2) IS 1/2 OF RANGE OF Gr(1)
RANGE OF Gr(3) IS 1/2 OF RANGE OF Gr(1)
RANGE OF Gr(4) IS 1/4 OF RANGE OF Gr(1)
RANGE OF Gr(5) IS 1/4 OF RANGE OF Gr(1)
RANGE OF Gr(6) IS 1/8 OF RANGE OF Gr(1)
RANGE OF Gr(7) IS 1/8 OF RANGE OF Gr(1)

CLASSIFY VALUES SO THAT LARGE I-PICTURE SIZES ARE DENSELY DISTRIBUTED

| ECC SIZE | GROUP |
|---|---|
| 4~11 | Gr(1) |
| 12~15 | Gr(2) |
| 16~19 | Gr(3) |
| 20~21 | Gr(4) |
| 22~23 | Gr(5) |
| 24 | Gr(6) |
| 25 | Gr(7) |
| 26~32 | Gr(8) |

FIG.21

CLASSIFICATION PATTERN 1
(NUMBER OF OCCURRENCES ARE EQUALLY DISTRIBUTED)

| NUMBER OF ECC BLOCKS | NUBER OF OCCURRENCES | GROUP |
|---|---|---|
| 1~7 | 992 | Gr(1) |
| 8 | 743 | Gr(2) |
| 9 | 790 | Gr(3) |
| 10 | 1569 | Gr(4) |
| 11 | 829 | Gr(5) |
| 12~13 | 1268 | Gr(6) |
| 14~16 | 996 | Gr(7) |
| 17~32 | 704 | Gr(8) |

STANDARD DEVIATION = 183.03
MORE EQUALLY DESTRIBUTED THAN PATTERN 2
(NOT DISPERSED WIDELY)

CLASSIFICATION PATTERN 2
(EQUALLY DISTRIBUTED ACCORDING TO ECC SIZE)

| NUMBER OF ECC BLOCKS | NUMBER OF OCCURRENCES | GROUP |
|---|---|---|
| 1~4 | 20 | Gr(1) |
| 5~8 | 1715 | Gr(2) |
| 9~12 | 3177 | Gr(3) |
| 13~16 | 1572 | Gr(4) |
| 17~20 | 564 | Gr(5) |
| 21~24 | 136 | Gr(6) |
| 25~28 | 3 | Gr(7) |
| 29~32 | 1 | Gr(8) |

STANDARD DEVIATION = 1157.8

FIG.22

| 3-BIT VALUE REPRESENTING I_end | SPEED RATE |
|---|---|
| 001 | ×16 |
| 010 | ×8 |
| 011 | ×6 |
| 100 | ×4 |
| 101 | ×3 |
| 110 | ×2 |
| 111 | ×1 |

RECORDING DEVICE, PLAYBACK DEVICE AND PROGRAM

BACKGROUND OF THE INVENTION (1) Field of the Invention

The present invention relates to a technique for creating an entry map.

(2) Description of the Related Art

An entry map is information used for reading data at a certain location in a data stream, where decoding can be started. For instance, an entry map for a video indicates the address and the size of each I-picture (Intra picture). A technique for creating such an entry map is necessary for playing back a video stream that is encoded with use of correlativity among frames, such as in MPEG-2 and MPEG-4 AVC, and this technique is adopted in BD-RE standard.

If the video stream is encoded by an encoding method such as MPEG2-Video and MPEG4-AVC, it is compressed with use of correlativity among frames included in the stream, and accordingly the P-picture and the B-picture can not be decoded unless the I-picture is decoded in advance. Therefore, a playback device reads an entry map, and interprets where to start reading the data. The entry map enables the playback device to immediately judge where, in the video stream, to start reading in order to decode the I-picture firstly, without actually analyzing the content of the stream. Using the entry map, it becomes possible to read I-pictures continuously without reading redundant data. This realizes special playback operations such as a playback at high speed and a reverse playback in a suitable manner, even if the video stream is recorded on a low-speed recording medium, such as an optical disc.

The following describes the entry map. The entry map includes entries, which are pieces of information about I-pictures included in the video stream. Each entry includes a pair of an I_start and an I_end.

The I_start is a relative address relative to the beginning of the video stream. The I_end is a 3-bit value showing the size of the I-picture. The size of the I-picture is represented by only 3-bit wide data, because a lot of I-pictures are included in the video stream and it is demanded that data for each I-picture should be represented in a short form.

SUMMARY OF THE INVENTION

The representation of the I-picture size using a 3-bit value is described next. In the BD-RE, an average transmission rate of 24 Mbps is assigned to the video stream. Therefore, the I-picture size is presumably within a certain range. Firstly, the I-picture size is divided into seven ranges. Here, each of the seven ranges can be represented by a 3-bit value (001b-111b). That is to say, the I-picture size is represented by one of the numerical values representing the divided ranges, namely the values 001b to 111b. This makes it possible to represent the I-picture size by the 3-bit value.

By the way, this 3-bit representation is based on that the fluctuation band of the bit rates is narrow. This is because the BD-RE standard using the entry map is designed for broadcast media, and there is no problem assuming that the fluctuation band of the bit rates is narrow. However, the case is quite different if the video stream is provided from a package medium, such as a BD-ROM. Because, a variety of videos, from a main content of a movie of high quality to a video as an extra bonus of poor quality, are recorded together on a package medium. The video stream is sometimes provided at a high transmission rate, for instance at an average rate of 48 Mbps, and sometimes provided at a low transmission rate, for instance at an average rate of 1 Mbps, and therefore the fluctuation band of the transmission rates is very wide. When the fluctuation band of the transmission rate is wide, the 3-bit of the I_end is not a sufficient bit width, and there is a problem that the I_end can not accurately represent the size of the I-picture.

The object of the present invention is to provide a recording device that can ensure efficient reading of I-pictures even in the case where the fluctuation band of the transmission rate for each video stream is wide.

The above object is fulfilled by a recording device that records a digital stream onto a recording medium, comprising: a detecting unit operable to detect sizes of Intra pictures included in the digital stream and output detected values including the Intra picture sizes; a classifying unit operable to classify the detected values into N groups; an assigning unit operable to generate assignment information which indicates distribution ranges of Intra picture sizes respectively belonging to the N groups in a one-to-one association with numerical values 1 to N respectively representing the N groups; and a recording unit operable to record an entry map onto the recording medium in association with the assignment information, the entry map representing each Intra picture included in the digital stream using the numerical values 1 to N.

The occurrence distribution of the Intra picture sizes changes as the bit rate of the digital stream changes. Therefore, the values are assigned to the distribution ranges of the Intra picture sizes. By recording information indicating the assignment, it becomes possible to know which value represents which occurrence range at the time of the playback.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings:

FIG. 1 shows a recording device 200 and a playback device 300 according to the present invention;

FIG. 2A shows an internal structure of an EP_map;

FIG. 2B shows functions of an I_start and an I_end in each entry;

FIG. 2C shows that only I-pictures are read from a video stream and played back;

FIG. 3 is an example graph showing occurrence rates of I-pictures included in a content, for each ECC block size;

FIG. 5 is a graph showing occurrence distribution of I-picture sizes in the case where a fluctuation band of assigned bit rates is wide;

FIG. 6 shows an internal structure of a recording device 200;

FIG-17A is a coordinate system showing an occurrence distribution of an I-picture size;

FIG. 17B is a coordinate system, in which an occurrence distribution of an I-picture size in FIG. 17A is classified into eight groups;

FIG. 18A is a coordinate system showing an occurrence distribution of an I-picture size, which is similar to FIG. 17A;

FIG. 18B is an example classification with consideration of singularities;

FIG. 21 shows specific examples of standard deviations calculated for two classification patterns;

FIG. 22 shows examples of assigned speed rates;

DESCRIPTION OF THE PREFERRED EMBODIMENTS

Figure 4A:
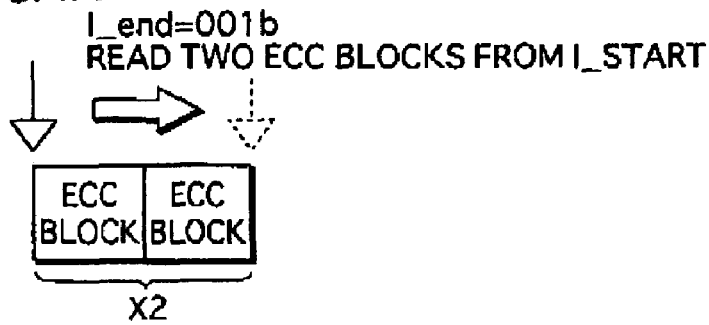
FIG. 4A to FIG. 4D show how a playback device 300 interprets an I_end.

The following describes a playback device according to preferred embodiments of the present invention. FIG. 1 shows a recording device 200 and a playback device 300 according to the present invention. Firstly, a recording medium 100, which is to be subjected to a recording by the recording device 200 and a playback by playback device 300, is described.

Recording Medium 100

The recording medium 100 is used for recording an EP_map thereon in association with an AVClip. The AVClip is a multiplexed transport stream generated by multiplexing elementary streams, such as a video stream, an audio stream and a graphics stream.

The EP_map is described next. FIG. 2A shows an internal structure of the EP_map. As shown in FIG. 2A, an entry map includes general information (EP_map_GI) and entries (Enry#1, . . . , Entry#k, . . . ) which are pieces of information about I-pictures. Each entry includes a pair of an I_start and an I_end. FIG. 25 shows functions of the I_start and the I_end included in each entry. In FIG. 2B, the lower figure represents a video stream, and the upper figure represents a group of the entries. This video stream includes I-pictures, P-pictures and B-pictures. The I_start included in each entry of the EP_map indicates a start position of each I_picture (Address#1, #2). Each I_end has a 3-bit value that indicates the size of each I_picture (001b, 010b). The start position and the size of the I-picture is shown in each entry, and therefore it is possible to realize special playbacks, such as a playback at double speed (×2 speed) and a playback at triple speed (×3 speed), by reading only the I-pictures from the video stream as shown in FIG. 2C.

Recording Device 200

The recording device 200 obtains the AVClip by performing an encoding based on an audio input and a video input into the recording device 200 itself. The recording device 200 also creates an EP_map corresponding to the AVClip, and writes the AVClip together with the EP_map on the recording medium 100. Here, the recording device 200 records the group of the entries such that the total size of the entries becomes small, by representing the I-picture size within a short bit width.

The following describes the representation of the I-picture size by the recording device 200.

If the I-picture size is recorded byte-by-byte, it can be represented with accuracy, and it is unnecessary to read redundant data for playing back only I-pictures continuously at a high speed. However, a large number of bits are required for recording the I-picture size byte-by-byte. For instance, if the maximum I-picture size is 1 Mbyte, 20 bits are required as the bit width. Meanwhile, the I-picture occurs approximately every 0.5 seconds, and the size of the EP_map becomes greater in accordance with the time length of the video stream. To the contrary, the reading from the optical disc is performed in units of reading, such as sectors and ECC blocks. In view of such a reality, the accuracy as high as the byte-by-byte recording is unnecessary. Therefore, the recording device 200 represents the I-picture size using the number of the ECC blocks. The ECC (Error Correction Code) block is a data unit for Reed-Solomon coding. With the ECC block, it is possible to detect a read error occurred in the block, and it is assured that some read errors can be restored to correct data.

In the case of the BD-ROM, the ECC block length is 64 k bytes. The playback device 300 reads data from each ECC block, and transfers only required data included in the ECC block to a memory, a decoder, and so on. Even if the I-picture size is smaller than the ECC block, or even if the I-picture size is as large as the ECC block, the size of the data read from the recording medium stay constant, because the data is read from the recording medium in units of the ECC blocks.

Based on such a circumstance, the I-picture size to be stored into the EP_map is recorded in units that are meaningful at the time of reading, such as units of ECC block sizes. The maximum I-picture size "1 Mbyte" can be represented as the maximum number of ECC blocks "20", where the ECC block size is 64 k byte (1 M byte<64 k byte×20).

The value "20" as the number of the ECC blocks can be represented by 5 bits. In this way, the data size of the EP_map can be reduced.

The following describes an optimization performed for further shortening the bit width that represents the I-picture size. The I-picture size depends on characteristics of original images to be compressed and an algorithm used for the compression. However, although the sizes of the I-pictures vary to some extent, it can be concentrated within a certain range if the transfer rate assigned to the video stream is fixed, to 24 Mbps for instance. FIG. 3 is an example graph showing occurrence rates of I-pictures of a certain content, by classifying the I-pictures according to their respective ECC block sizes. Each original image has a type, such as an image of nature and an animation, and each type has a different characteristic. The bit rate to be assigned to each type is different as well. Therefore, the I-picture sizes on the graph of FIG. 3 showing the occurrence rates are distributed over different ranges. However, it is empirically known that the I-picture sizes are almost always distributed in the same manner (the normal distribution).

In the upper graph of FIG. 3, the vertical axis represents the number of occurrences of the I-picture, and the horizontal axis represents the size of the I-picture by the number of the ECC blocks. Note that the horizontal axis represents the offset address (I_end) from the start address to the end address of the I-picture included in the multiplexed stream.

Apart from the case where pieces of image data of different types, such as an image of nature and an animation, are compressed together as one video stream, the original images that are to be compressed into one video stream usually have a similar characteristic. Therefore, the number of the occurrences on the graph is almost always concentrated within a certain range in terms of the horizontal axis. In FIG. 3, for instance, most of the I-picture sizes are concentrated within the range where the number of the ECC blocks is between 8 and 9.

The I-picture does not show the difference between reference images, and always includes pixels for one frame. Therefore the I-picture size does not become very small, and there is few I-picture that includes not more than seven ECC blocks. Also, apart from some hard-to-compress images, the I-picture size hardly becomes extremely large, because one algorithm is used for the compression.

Given these factors, to represent the I-picture size by a narrower bit width, the ranges where the occurrence rate of the I-picture size (the number of ECC blocks) is low are integrated together, while a resolution within a range where the occurrence rate is high is maintained. It is assumed in FIG. 3 that in the case where 24 Mbps of the transfer rate is assigned to the video stream for instance, the maximum I-picture size is thirty-two ECC blocks. For representing the number "32", 5 bits are required. However, the I-picture size can be represented by 4 bits or 3 bits by dividing the horizontal axis of the graph into 16 groups or 8 groups, and representing the I-picture size by showing which group the I-picture belongs to.

Here, the bit width of 3 bits should be used effectively for representing data. If all the I-pictures are 100 Kbytes or more, there is no point in dividing the range between 0 and 90 Kbytes into smaller ranges and representing each range by 3 bits. Such a representation should be avoided.

When the minimum I-picture size in the graph is 92276 bytes, the size can be represented by the number of ECC blocks as 1.4 ECC blocks, which is nearly equal to 92276 bytes, and 0≦1.4 ECC blocks<2 ECC blocks is true. Therefore, the playback device 300 is required to read at least two ECC blocks. Accordingly, the assignment is performed so that the playback device 300 reads at least two ECC blocks.

The broken lines shown in FIG. 3 are borders between the groups of the I-picture size. As shown in FIG. 3, the I-picture size is classified by the borders which represent the sizes of 0, 2, 4, 6, 9, 14 and 20 ECC block(s) respectively. Seven values "001b" to "111b" are assigned to the respective borders. The lower graph in FIG. 3 shows such an assignment. The value "001b" is assigned to the border representing 0 ECC block, the value "010b" is assigned to the border representing 2 ECC blocks, the value "011b" is assigned to the border representing 4 ECC blocks, the value "100b" is assigned to the border representing 6 ECC blocks, the value "101b" is assigned to the border representing 9 ECC blocks, the value "110b" is assigned to the border representing 14 ECC blocks, and the value "111b" is assigned to the border representing 20 ECC blocks. In this embodiment, the 3-bit value "000b" is not assigned to any border, because "000b" is desired to be used for representing an invalid entry.

As described above, the I-picture size is represented by the values 001b to 111b assigned to the borders, and these values are described in the I_end. For instance, if the I-picture size of an I-picture is 65536 bytes which corresponds to the size of one ECC block, the size belongs to the range between 0 and 2 in FIG. 3. The I-picture size is represented by describing the value "001b (=1)" in the I_end.

If the I-picture size of another I-picture is 196608 bytes which corresponds to the size of three ECC blocks, the size belongs to the range between 2 and 4 in FIG. 3. The I-picture size is represented by describing the value "010 (=2)" in the I_end. In this way, the I_end for each entry is described to create the EP_map.

This is end of the description of the recording device 200.

Playback Device 300

The playback device 300 plays back the AVClip recorded on the recording medium. If the recording medium is an optical disc, random access is available. However, the seek time is longer than the case of HDDs and semi-conductor memories. This is the principal factor responsible for degradation in response time. For the cases where seeks are frequently performed, such as cases of performing special playbacks, it is important not to perform redundant seeks and not to read unnecessary data. Therefore, the playback device 300 performs the playback at double speed by playing back only I-pictures continuously with reference to a group of entries included in the entry map. The information about the locations and sizes of the I-pictures are used very effectively at the time of such a playback at double speed. The playback device 300 assumes that the values 000b to 111b are assigned to I-picture sizes as shown in the lower graph of FIG. 3, and determines the amount of the data, which the playback device 300 reads from the recording medium, based on the values. Here, the amount of the data is represented by each of distribution ranges, which are obtained by dividing the occurrence distribution of the I-picture sizes according to the borders as shown in FIG. 3. FIG. 4A to 4D show how the playback device 300 interprets the I_end.

For instance, if the 3-bit value representing the I_end is "001b" as shown in FIG. 4A, "001b" is assigned to the range of I-picture size where "the number of the ECC blocks=0 to 2", and therefore, the value "0" is interpreted as the lower limit of the amount of the data that the playback device 300 reads. Meanwhile, the upper limit of the amount is "the number of the ECC blocks=2" that corresponds to the 3-bit value "001b+1b", that is "010b". Accordingly, the I-picture size is equal to or more than 0 and less than 2. The playback device 300 reads two ECC blocks from the start address of the I-picture.

Figure 4B:
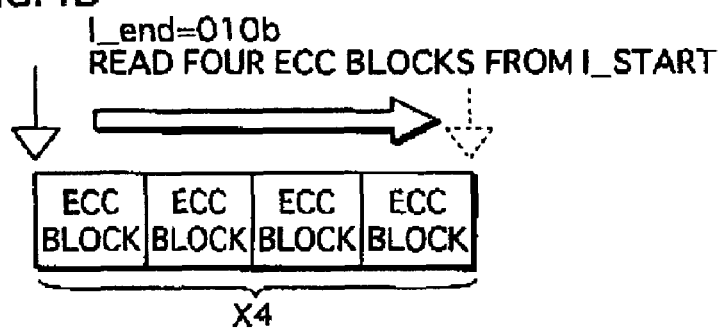

If the 3-bit value representing the I_end is "010b" as shown in FIG. 4B, "010b" is assigned to the range of I-picture size where "the number of the ECC blocks=2 to 4", and therefore, the value "2" is interpreted as the lower limit of the amount of the data that the playback device 300 reads. Meanwhile, the upper limit of the amount is "the number of the ECC blocks=4" that corresponds to the 3-bit value "010b+1b", that is "011b". Accordingly, the I-picture size is equal to or more than 2 and less than 4. The playback device 300 reads four ECC blocks from the start address of the I-picture.

Figure 4C:
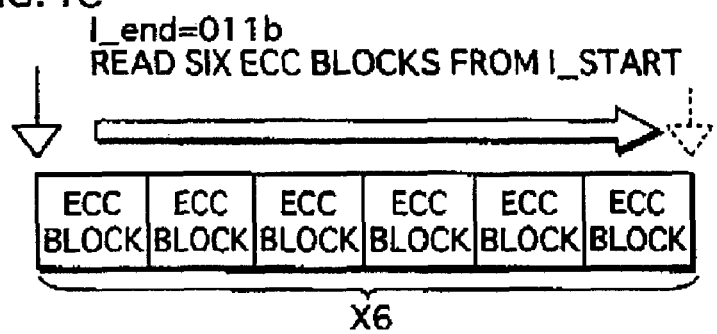

If the 3-bit value representing the I_end is "011b" as shown in FIG. 4C, "011b" is assigned to the range of I-picture size where "the number of the ECC blocks=4 to 6", and therefore, the value "4" is interpreted as the lower limit of the amount of the data that the playback device 300 reads. Meanwhile, the upper limit of the amount is "the number of the ECC blocks=6" that corresponds to the 3-bit value "011b+1b", that is "100b". Accordingly, the I-picture size is equal to or more than 4 and less than 6. The playback device 300 reads six ECC blocks from the start address of the I-picture.

Figure 4D:
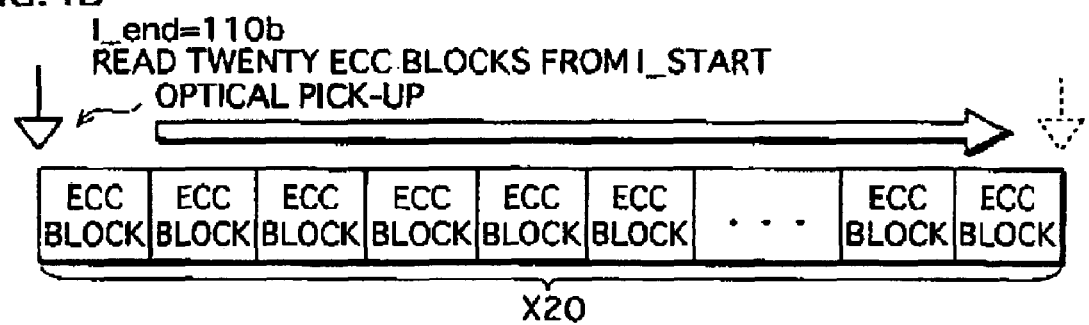

If the 3-bit value representing the I_end is "110b" as shown in FIG. 4D, "110b" is assigned to the range of I-picture size where "the number of the ECC blocks=14 to 20". Therefore, the value "14" is interpreted as the lower limit of the amount of the data that the playback device 300 reads. Meanwhile, the upper limit of the amount is "the number of the ECC blocks=14" that corresponds to the 3-bit value "110b+1b", that is "111b". Accordingly, the I-picture size is equal to or more than 14 and less than 20. The playback device 300 reads twenty ECC blocks from the start address of the I-picture.

As described above, the recording device 200 and the playback device 300 determine the I-picture size based on the value represented by 3-bit value.

In FIG. 3, it is assumed that the assigned bit rate is 24 Mbps. In the case where a plurality of video streams are recorded on the recording medium and the bit rate varies widely for each video stream, it is impossible to represent the optimum data amount for the reading by a 3-bit width. FIG. 5 shows the occurrence rates of I-pictures in the case where the fluctuation band of assigned bit rates is wide. The full line is the same as that shown in FIG. 3, which represents the occurrence rates when the average bit rate is 24 Mbps. The broken lines show the occurrence rates when the average bit rate is 1 Mbps and 48 Mbps. The peaks of the occurrence rates are within the ranges represented by "001b" and "111b" respectively. Here, the lower limit of the range represented by "111b" is 20 ECC blocks. However, its upper limit is not defined. Therefore, to read enough I-pictures belonging to the range "111b", it is required to read extra ECC blocks, for instance 40 or 50 ECC blocks. This is the worst case, because the amount of the data to be read becomes too large. Therefore, if such a worst case occurs frequently, the reading efficiency is to be extremely degraded.

The structure of the recording device 200 is designed to avoid such a worst case. The following describes the recording device 200 according to the present invention, with reference to FIG. 6. FIG. 6 shows the internal structure of the recording device 200. As shown in FIG. 6, the recording device 200 includes a video encoder 1, a multiplexer 2, a write buffer 3, a drive unit 4, a statistical memory 5, an analysis unit 6 and a scenario memory 7.

The video encoder 1 encodes an input video signal to obtain a video stream, and outputs the video stream. When a transport stream that is previously encoded is input into the recording device 200, the video encoder 1 may transcode the transport stream, or may output the transport stream as it is to the multiplexer 2.

The multiplexer 2 multiplexes a video stream output from video encoder 1 and other elementary streams, such as a graphics stream and an audio stream to obtain an AVClip, and outputs the AVClip to the write buffer 3. At the time of the multiplexing, the multiplexer 2 detects the sizes of I-pictures included in the AV clip, and writes the detection result, that is the I-picture sizes, into the statistical memory 5 as the measured values. This detection includes a measuring operation for measuring the number of TS packets including the TS packet that stores the beginning of the I-picture to the TS packet that stores the end of the I-picture, and a reading operation for reading the I-picture size from the I-picture size field. Also when a transport stream that is previously encoded is input into the recording device 200, the multiplexer 2 detects the addresses and the sizes of the I-pictures, and writes the detection result, that is the measured values, into the statistical memory 5.

Here, the measured values, which are output by the multiplexer 2, represent the sizes of I-pictures in the transport stream format, and do not represent the sizes of the I-pictures included in the video stream. This means that the total data size of the TS packets including the TS packet that stores the beginning of the I-picture to the TS packet that stores the end of the I-picture is represented as the "I-picture size". Therefore, in the case where a TS packet that includes a part of other elementary stream, such as an audio stream and a graphics stream, exists between the TS packet that stores the beginning of the I-picture and the TS packet that stores the end of the I-picture, the total of the size of such a TS packet and the original I-picture size is to be output as the measured value representing the I-picture size.

When a transport stream that is previously encoded is input into the recording device 200, the multiplexer 2 may extract only a required elementary stream and convert the elementary stream into a partial transport stream in which PSI/SI packets are modified. The PSI/SI packets are packets that include structure information of a program defined in the MPEG standard and the digital broadcasting standards.

The drive unit 4 sequentially writes AVClips written into the write buffer 3 into the recording medium 100.

The statistical memory 5 is a memory into which a plurality of measured values output from the multiplexer 2 are to be written.

The analysis unit 6 analyzes the plurality of the measured values, which are written into the statistical memory 5, to generate an I_end_table and a group of entries in the scenario memory 7. The I_end_table is a constituent of the EP map. In this embodiment, the EP map is generated from the I_end_table and the group of the entries. The analysis unit 6 records the generated EP_map on the recording medium.

Figure 7:
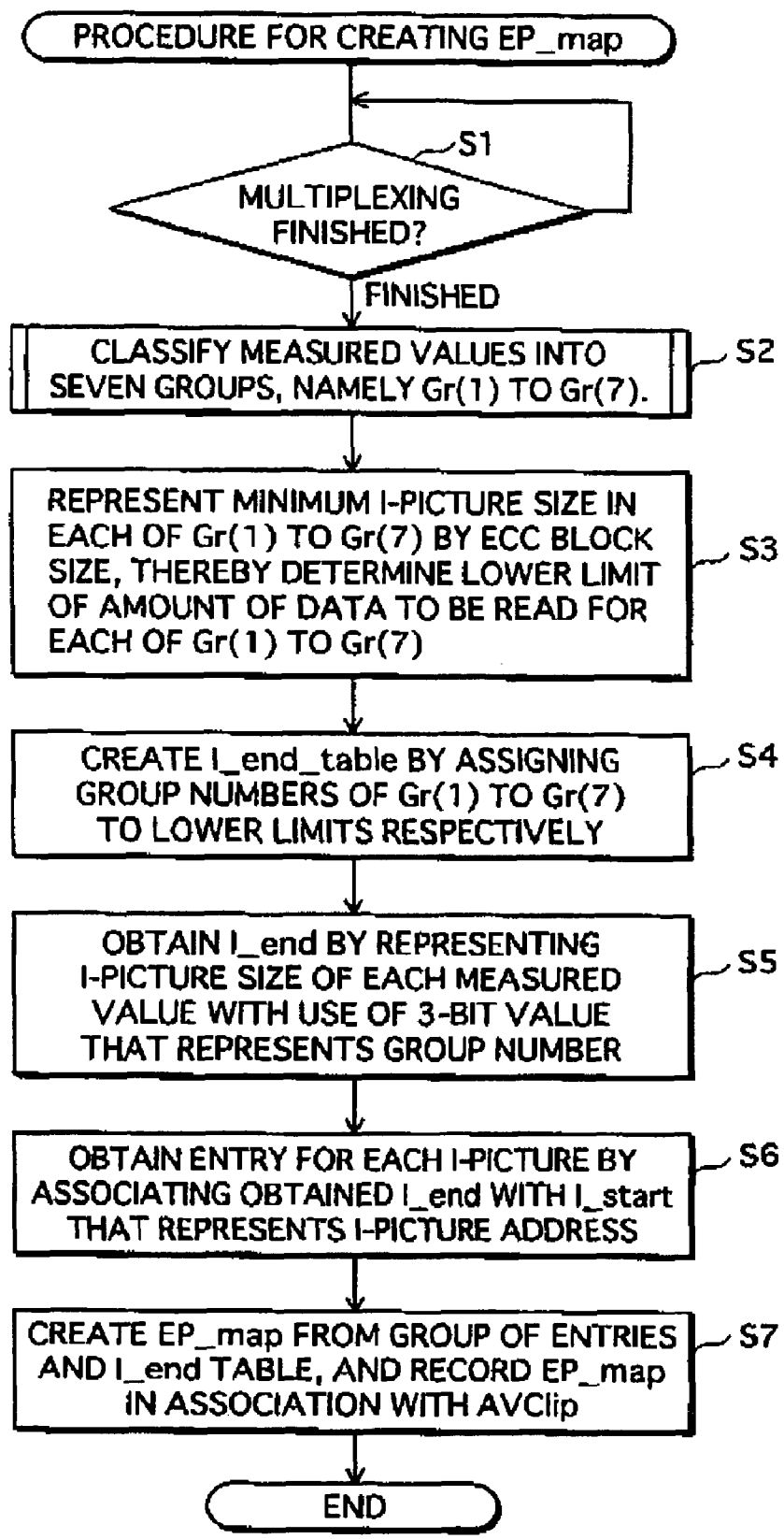
FIG. 7 is a flowchart showing a procedure performed by an analysis unit 6 for creating an EP_map.

FIG. 7 is a flowchart showing a procedure performed by an analysis unit 6 for creating an EP_map. The analysis unit 6 waits for the multiplexing to finish (Step S1), and when the multiplexing finishes, the analysis unit 6 classifies the measured values into seven groups, namely Gr(1) to Gr(7) (Step S2). Then the analysis unit 6 represents the minimum I-picture size in each of Gr(1) to Gr(7) by the ECC block size, thereby determines the lower limit of the amount of the data to be read for each of Gr(1) to Gr(7) (Step S3). The analysis unit 6 creates an I_end_table by assigning the group numbers of Gr(1) to Gr(7) to the lower limits respectively (Step S4).

Next, the analysis unit 6 creates the group of the entries. The analysis unit 6 obtains the I_end by representing, with use of the 3-bit value that represents the group number, the I-picture size included in each measured value (Step S5). The analysis unit 6 obtains the group of the entries for I-pictures by associating the obtained I_end with the I_start that represents the I-picture address (Step S6).

The table obtained in Step S4 is called the I_end_table. The I_end_table is differently distributed for each stream to be compressed. Therefore, it is preferable that the I_end_table can be switched from one to another for each stream, and each file. Therefore, upon creating the group of the entries and the I_end_table through the above-described procedure, the analysis unit 6 creates the EP_map from the group of the entries and the I_end_table, and records the EP_map in association with the AVClip on the recording medium (Step S7).

The creation of the group of the entries is performed in the following manner. The I_end_table is created in the above-described manner according to the distribution characteristic of the occurrence rates of the I-picture sizes, and written into an area of the EP_map which is reserved for defining the I_end_table. Accordingly, it becomes possible to switch the I_end_table, which defines the I_end used for surely reading the I-picture, for each stream and each file.

When the I-picture sizes obtained by analyzing the AV clip are distributed as FIG. 3 shows, the I_end should be set such that the number of the I-pictures are distributed equally in each range of the I-picture size. The equalization can be realized by analyzing the sizes of all the I-pictures (the number of the I-pictures is N), sorting the sizes of the I-pictures in ascending order, classifying the I-picture sizes into groups based on the total number of the I-pictures divided by 7, and assigning a multiple of the ECC block size that is more than and nearest to the divided number to each group.

Figure 8:
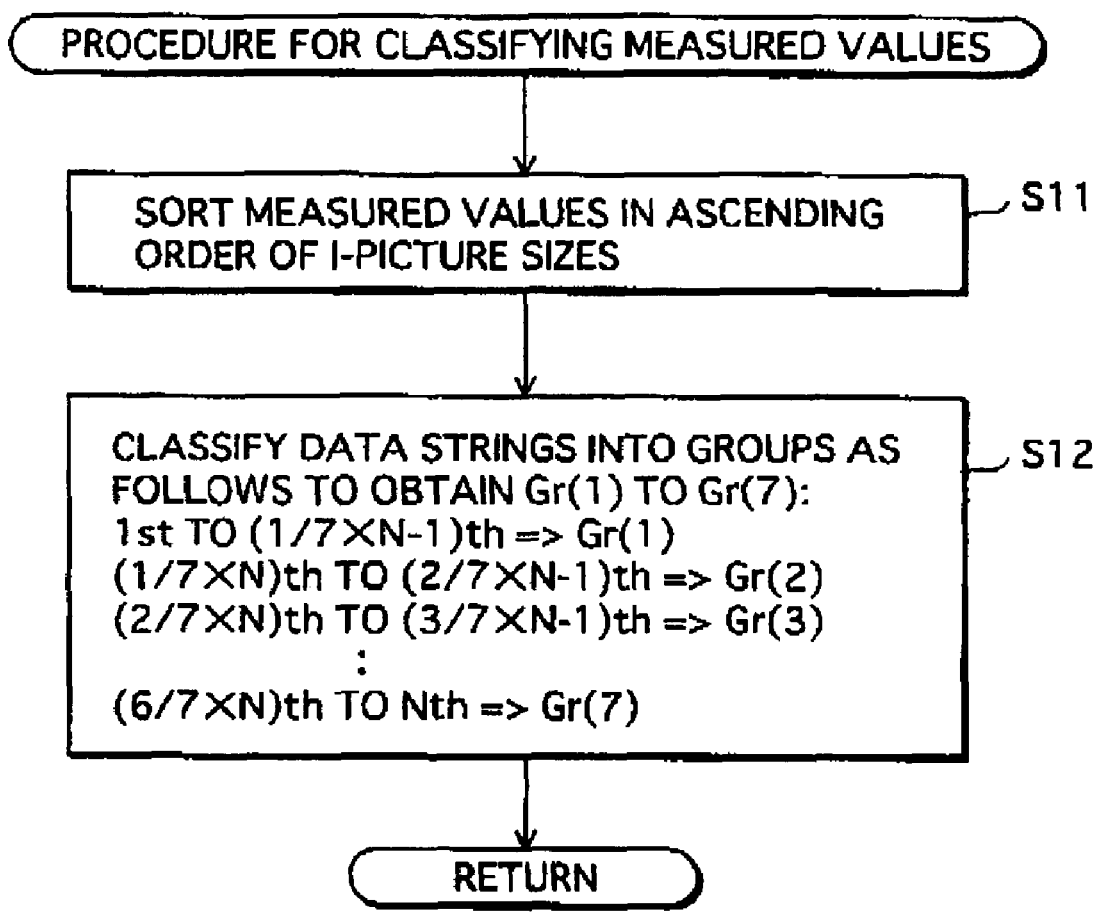
FIG. 8 is a flowchart showing a procedure for classifying measured values.

A flowchart of FIG. 8 shows such a procedure. FIG. 8 is a flowchart showing a procedure for classifying measured values.

Firstly, the measured values are sorted in ascending order of the I-picture sizes (Step S11). Data strings obtained by the sorting are classified into groups as follows (Step S12):

$1^{st}$ to $1/7 \times N - 1^{th} =>$ Gr(1) $1/7 \times N^{th}$ to $2/7 \times N - 1^{th} =>$ Gr(2) $2/7 \times N^{th}$ to $3/7 \times N - 1^{th} =>$ Gr(3) $3/7 \times N^{th}$ to $4/7 \times N - 1^{th} =>$ Gr(4) $4/7 \times N^{th}$ to $5/7 \times N - 1^{th} =>$ Gr(5) $5/7 \times N^{th}$ to $6/7 \times N - 1^{th} =>$ Gr(6) $6/7 \times N^{th}$ to $N^{th} =>$ Gr(7).

As a result, the groups Gr(1) to Gr(7) are obtained. If Gr(3) is 5.3 ECC blocks for instance, an integer 6, which is more than and nearest to 5.3, should be assigned to Gr(3).

In this example, thirty-two ECC blocks (5 bits) are classified into seven groups. However, the number of the groups and so on is not limited to this as long as the number is not larger than the example.

The detail of the classification performed in Step S12 is described next with reference to a specific example shown in FIG. 9.

Figure 9:
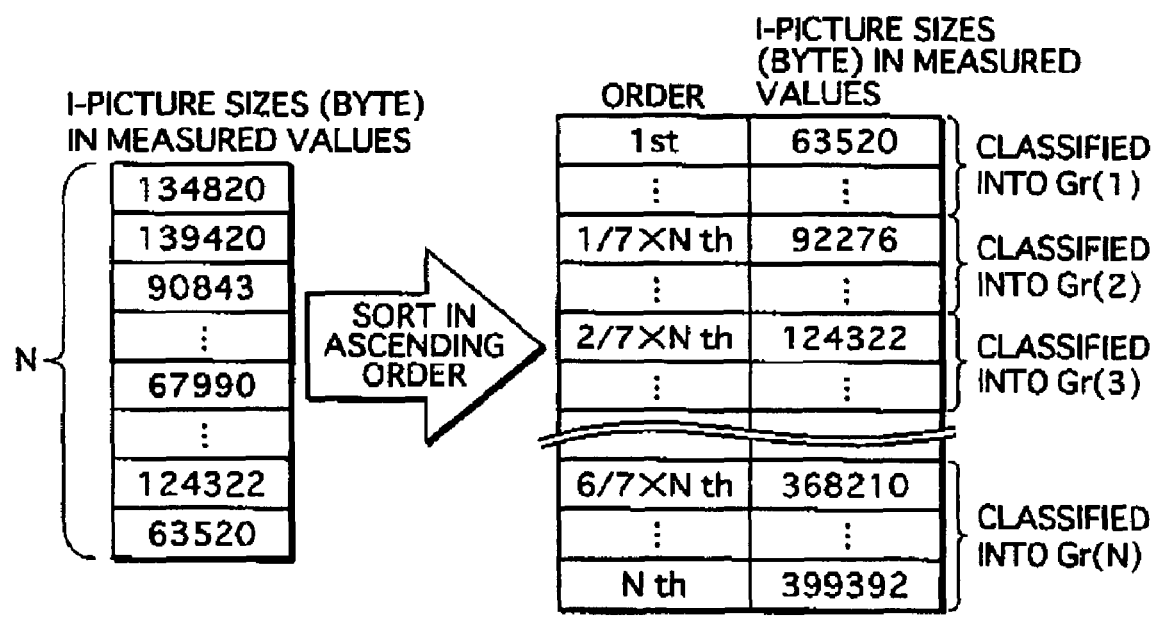
FIG. 9 shows an example classification procedure performed in Step S12.

The table on the left of FIG. 9 is the measured values. The table on the right is the result of sorting the measured values. The braces in the figure represent the classification into seven groups, namely Gr(1) to Gr(7).

By such a classification, the $1^{st}$ measured value "63520" to the $1/7 \times N - 1^{th}$ measured value are classified into Gr(1), the $1/7 \times N^{th}$ measured value "92276" to the $2/7 \times N - 1^{th}$ measured value are classified into Gr(2), the $2/7 \times N^{th}$ measured value "124322" to the $3/7 \times N - 1^{th}$ measured value are classified into Gr(3), and the $6/7 \times N^{th}$ measured value to the $N^{th}$ measured value are classified into Gr(7).

Figure 10A:
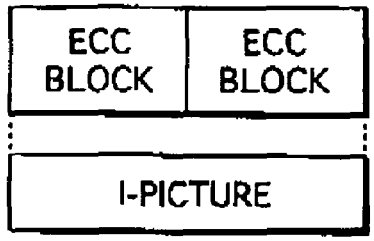
FIG. 10A to FIG. 10C show details of a conversion performed for converting I-picture sizes into numbers of ECC blocks.

FIG. 10A to 1C show the detail of the conversion performed for converting the I-picture size into the number of the ECC blocks. The quotient of the I-picture size divided by the ECC block size is to be regarded as the number of the ECC blocks (FIG. 10A).

Figure 10B:
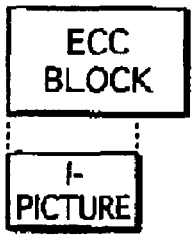
Figure 10C:
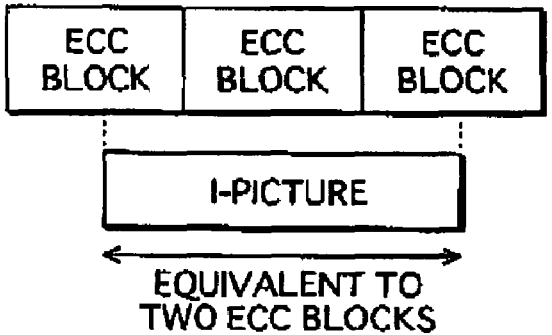

However, in this case if the I-picture size is smaller than the ECC block size, the number of the ECC blocks becomes "0". Furthermore, if the I-picture is not aligned with the border between the ECC blocks, it becomes impossible to read sufficient data. Here, if the I-picture is "aligned", it means that the I-picture is properly arranged in a position starting from the border between the ECC blocks. If the I-picture size is as large as the two ECC blocks, and I-picture is arranged in a position starting from the middle of the ECC block, a part of I-picture might not be read properly only by reading two ECC blocks. FIG. 10C shows a case in which the I-picture is not aligned with the border between the ECC blocks. In this embodiment, assuming the cases of FIGS. 10B and 10C, the formula for converting the I-picture size into the number of the ECC blocks is defined as follows:

The number of ECC blocks=I-picture size/ECC block size+1.

The addition "+1" means that one extra ECC block is to be included in the count. Accordingly, it becomes possible to read sufficient ECC blocks even in the case of FIG. 10B, where the I-picture size is smaller than the ECC block size, and in the case of FIG. 10C, where the I-picture is not aligned with the border between the ECC blocks.

Figure 11:
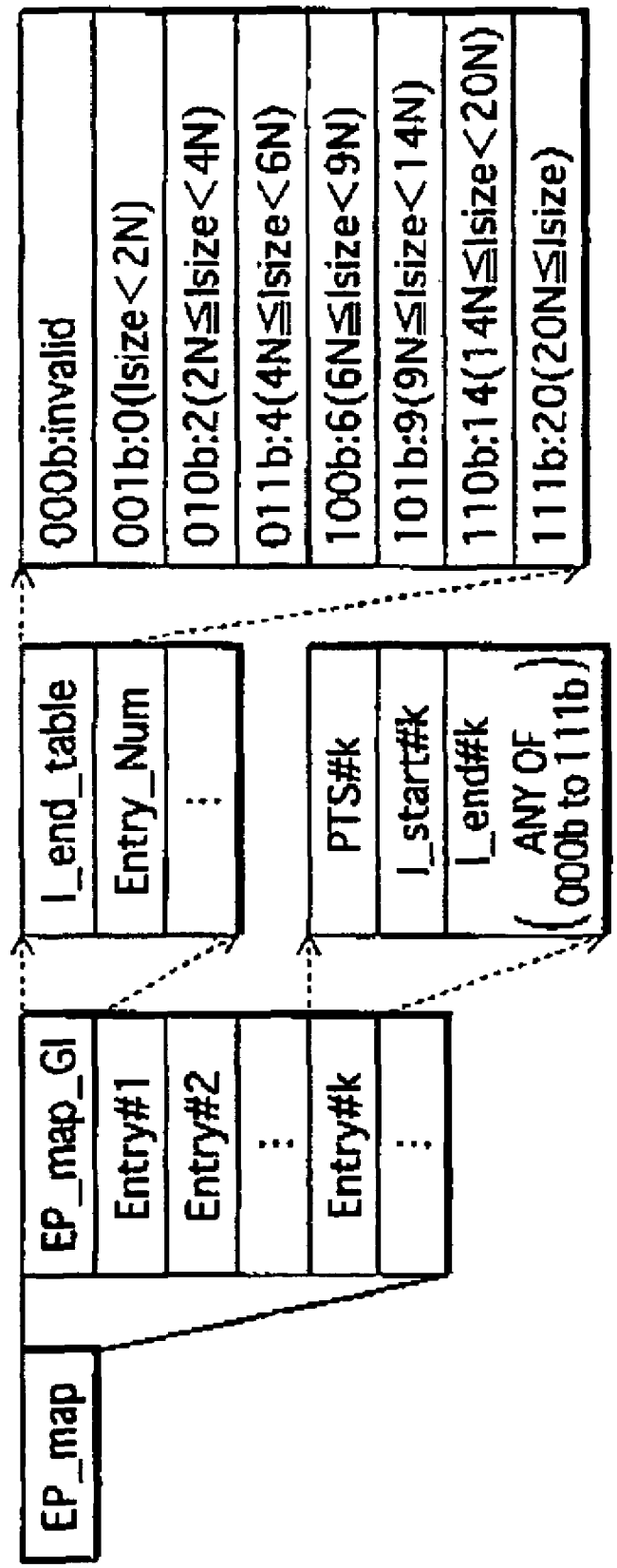
FIG. 11 shows an EP_map that is obtained by integrating an I_end_table and a group of entries.

FIG. 11 shows the EP_map that is obtained by integrating the I_end_table and the group of the entries. In FIG. 11, the I_end_table is integrated into the EP_map as an information element, namely I-picture information for the EP_map (EP_map_GI). Therefore, the playback device 300 can properly interpret the I_end (3-bit value) by referring to the I_end_table in the EP_map_GI.

Figure 12:
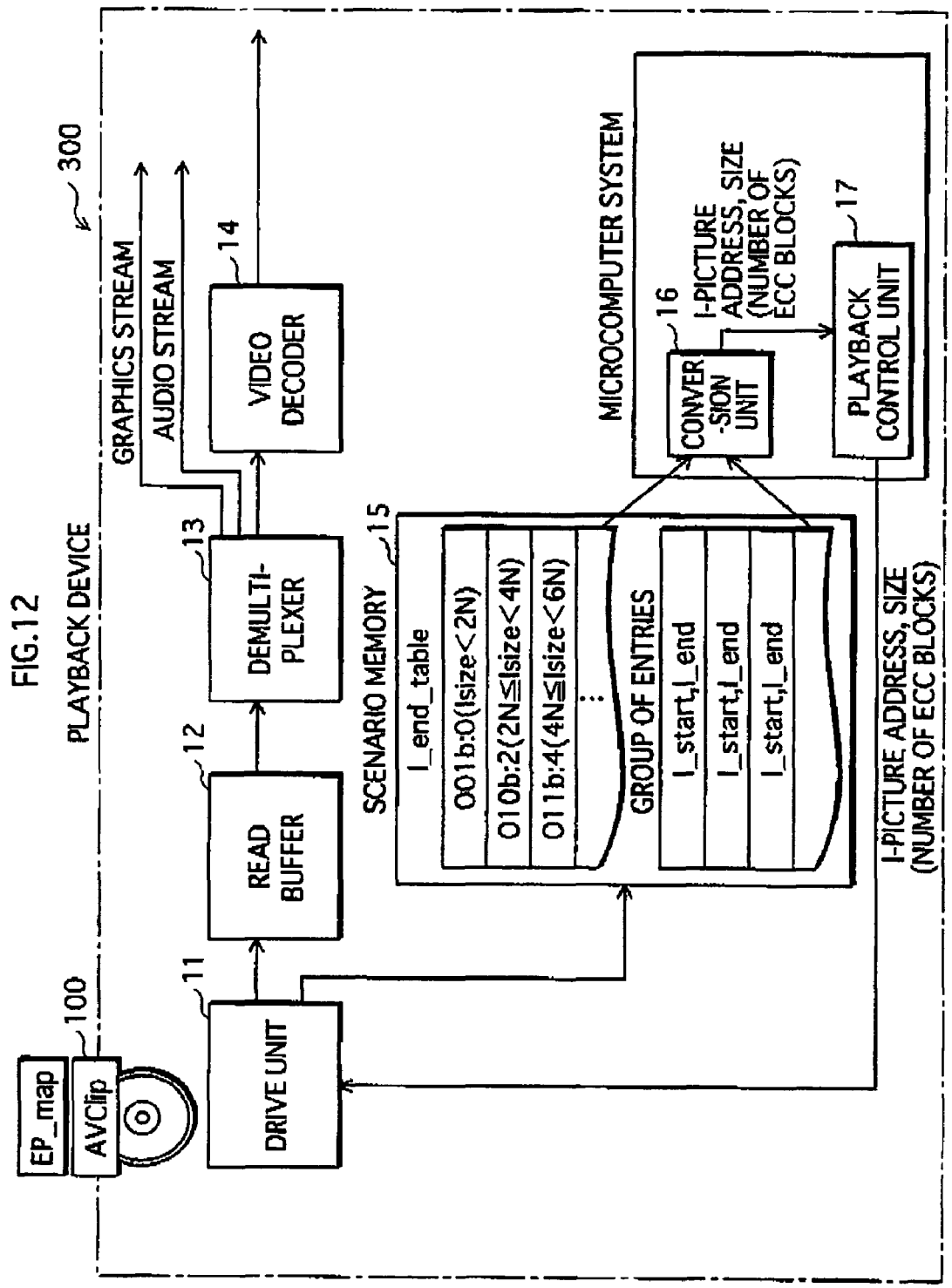
FIG. 12 shows an internal structure of playback device 300 according to the present invention.

The internal structure of the recording device 200 is described above. The internal structure of the playback device 300 according to the present invention is described next. FIG. 12 shows the internal structure of the playback device 300. The playback device 300 includes a drive unit 11, a read buffer 12, a demultiplexer 13, a video decoder 14, a scenario memory 15, a conversion unit 16 and a playback control unit 17.

The drive unit 11, to which the recording medium having the EP_map and the AVClip recorded thereon is inserted, performs a reading and a writing of data on the recording medium.

The read buffer 12 is a buffer used for temporally storing the AVClip read from the drive unit 11.

The demultiplexer 13 demultiplexes the AVClip to obtain the video stream, the graphics stream, and the audio stream.

The video decoder 14 decodes the video stream obtained through the demultiplexing by the demultiplexer 13 to output a video.

The scenario memory 15 is a memory from which the I_end_table and the group of entries are read.

The conversion unit 16 converts the 3-bit I_end data described in each entry included in the group of the entries into the amount of data to be read. When a value "xxx" is described as the I_end in an entry in the group of the entries, the conversion unit 16 reads a number of ECC blocks "y" associated with the value "xxx" from the I_end_table, and converts the number "y" into the lower limit of the amount of reading. Furthermore, the conversion unit 16 reads a number of ECC blocks "z" associated with the value "xxx+1" from the I_end_table, and converts the number "z" into the upper limit of the amount of reading. The I-picture size is equal to or more than "y" and less than "z". Accordingly, the size of data that the drive unit 11 needs to read is "z" ECC blocks beginning from the I_start. Here, if the value "xxx" is "001b", the number "0" associated with "000b" in the I_end_table is converted into the lower limit of the amount of reading. The number "2" associated with "010b" (=xxx+1) is converted into the upper limit of the amount of the reading. As a result, the I-picture size satisfies:

0 ECC block≦I-picture size<2 ECC blocks.

Therefore, it is required to read two or more ECC blocks for reading the I-picture in full measure.

That is to say, the playback device 300 is required to read the data having the size equal to or more than the maximum I-picture size described, for each I_end, in the I_end_table.

The playback control unit 17 instructs the drive unit 11 to read a range beginning from the I-picture address described in the I_start and including more than z ECC blocks such that the I-picture is provided from the recording medium to the decoder.

As described above, the first embodiment enables each of the I-picture sizes to be represented by a small amount of information and a small number of bits, by indirectly referring to the I_end_table that classifies the sizes into the groups. Therefore, it becomes possible to suppress the number of the bits required for representing information which frequently occurs, such as information for each I-picture.

The Second Embodiment

In the first embodiment, the playback device 300 integrates the I_end_table as an information element of the EP_map_GI into the EP_map. However, in the second embodiment, it is disclosed that the I_end_table is separated from the EP_map. An identifier (I_end_table_id) is added to the I_end_table for identifying each I_end_table separated from the EP_map. A reference value (I_end_table_id_ref) used for referring to the I_end_table is included in the EP_map_GI by way of compensation for the separation.

Figure 13:
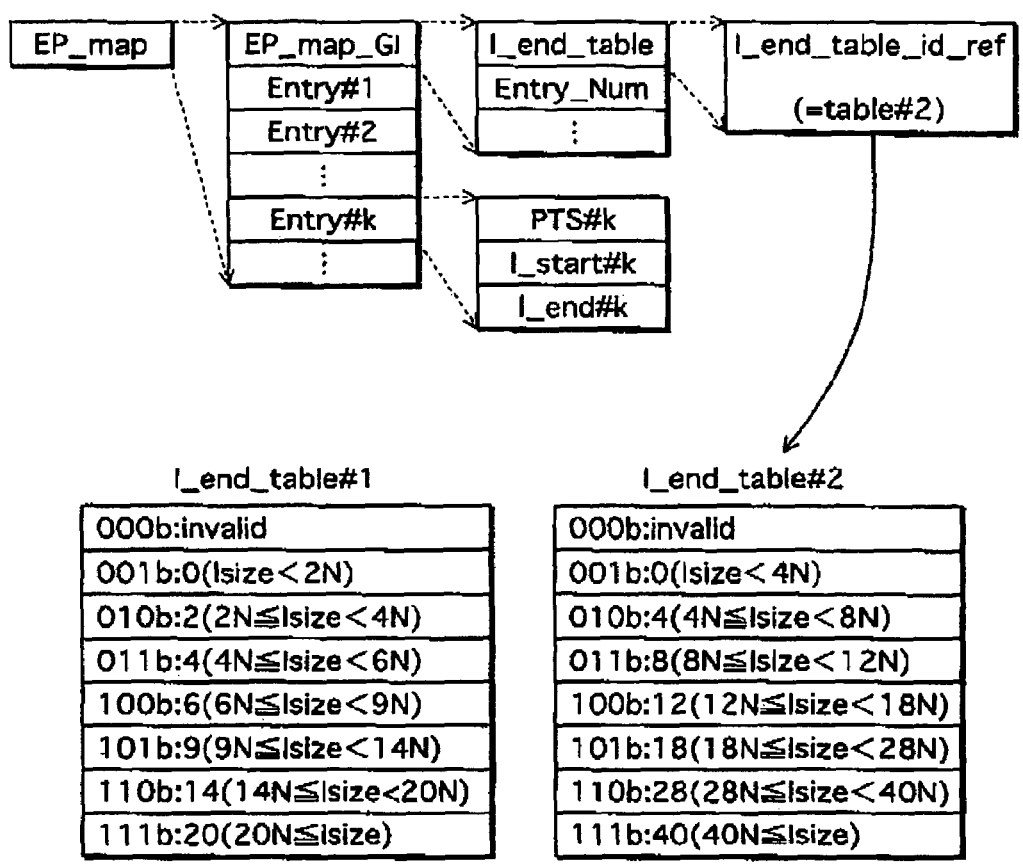
FIG. 13 shows a data structure of an EP_map according to the second embodiment.

FIG. 13 shows the data structure of the EP_map according to the second embodiment. The reference value (I_end_table_id_ref) is described in the EP_map_GI, and therefore the playback control unit 17 according to the second embodiment reads the I_end_table_id_ref from the EP_map_GI, and interprets the 3-bit value I_end using the I_end_table that corresponds to the read I_end_table_id_ref out of I_end_tables that are previously defined. The setting for each I_end_table may be previously defined in common, or may be recorded on the recording medium.

By separating the I_end_table from the EP_map, it becomes possible for a plurality of AVClips to share one I_end_table. This reduces the size of the EP_map.

As described above, in the second embodiment, the EP_map can be defined easily, because if the characteristic of the original image of the movie content and the characteristic of the encoder are within narrow ranges respectively, it is unnecessary to set the I_end_table every time. Only the I_end_table that is to be referred is required to be specified. A default I_end_table may be set in case the reference value is invalid.

The Third Embodiment

The third embodiment relates to a modification for recording the I_end_table separated from the EP_map, just as the second embodiment. Additional information is set up at the time of recording the I_end_table. This additional information represents what encoding method the video stream corresponding to the I_end_table is encoded by. If the video stream is encoded by the MPEG2-video encoding, the additional information indicating the MPEG2-video encoding is to be described in the I_end_table, and if the video stream is encoded by the MPEG-AVC encoding, the additional information indicating the MPEG-AVC encoding is to be described in the I_end_table.

Figure 14:
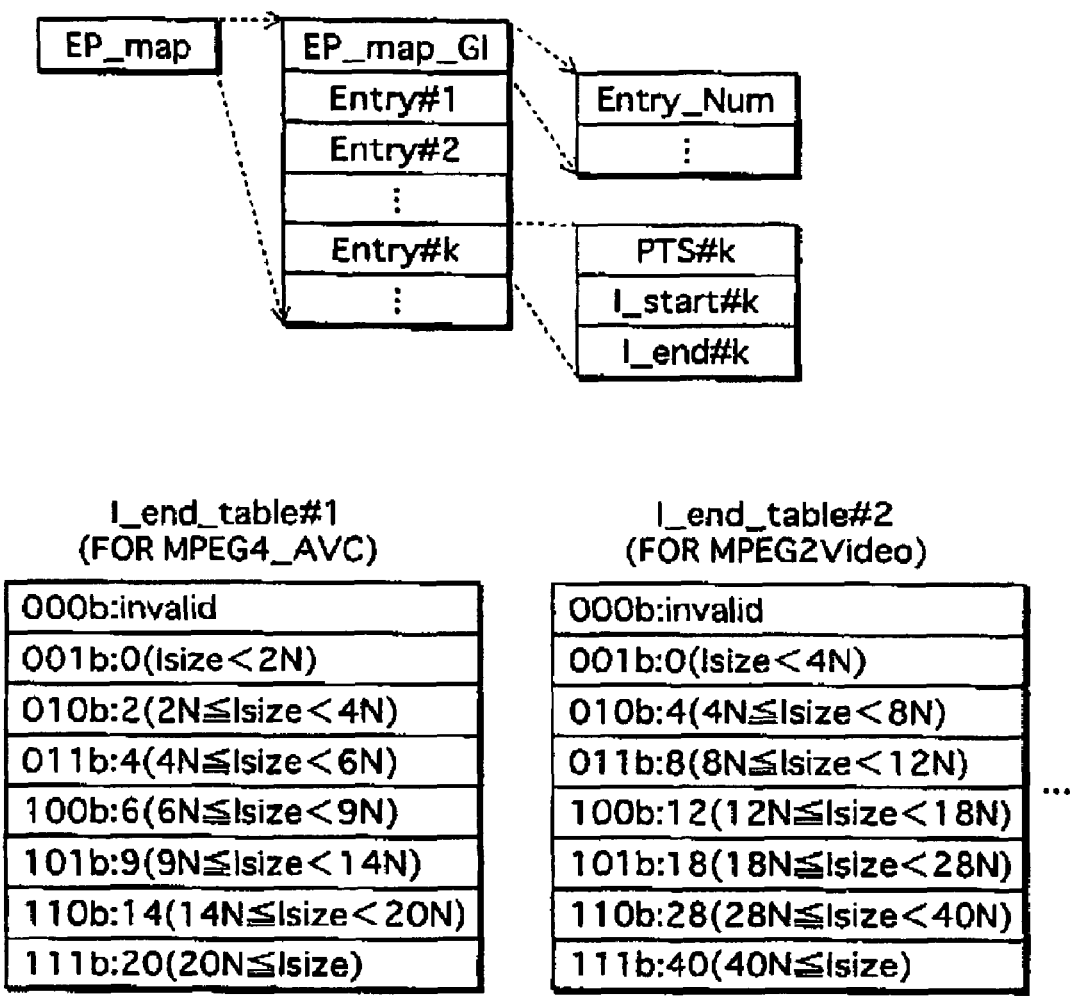
FIG. 14 shows an entry map according to the third embodiment.

FIG. 14 shows the entry map according to the third embodiment. In FIG. 14, the I_end_table#1 includes the additional information for the MPEG4-AVC, and the I_end_table#2 includes the additional information for the MPEG2-video.

Meanwhile, at the time of the playback, the playback control unit 17 detects the encoding method used for the AVClip that is to be played back, reads out the I_end_table corresponding to the detected encoding method out of a plurality of I_end_tables that are previously defined (or recorded on the recording medium), and interprets the 3-bit value in each entry with reference to the read I_end_table.

As described above, according to the third embodiment, if the occurrence rates are almost the same when the attribute of the stream, such as MPEG-2 and MPEG4-AVC, is the same, it becomes possible to previously define I_end_table for each stream attribute. This reduces the number of the I_end_tables. Also, it becomes possible to determine which I_end_table should be referred to, without using the reference value for the I_end_table. This makes the process performed by the playback device 300 simple.

Note that in addition to the encoding method, the average bit rate of the stream, the maximum bit rate, the category that the content using the stream belongs to and so on, or their combination may be used for switching the I_end_table to be referred according to the attribute of the stream. Furthermore, a default I_end_table, which is referred to in the case where no attribute information exists, may be prepared.

The Fourth Embodiment

In the first embodiment, the I-picture sizes are represented by number of bytes and they are classified into groups. However, in the fourth embodiment, the I-picture sizes included in the measured values are previously represented by the number of the block sizes to be classified into groups.

Figure 15:
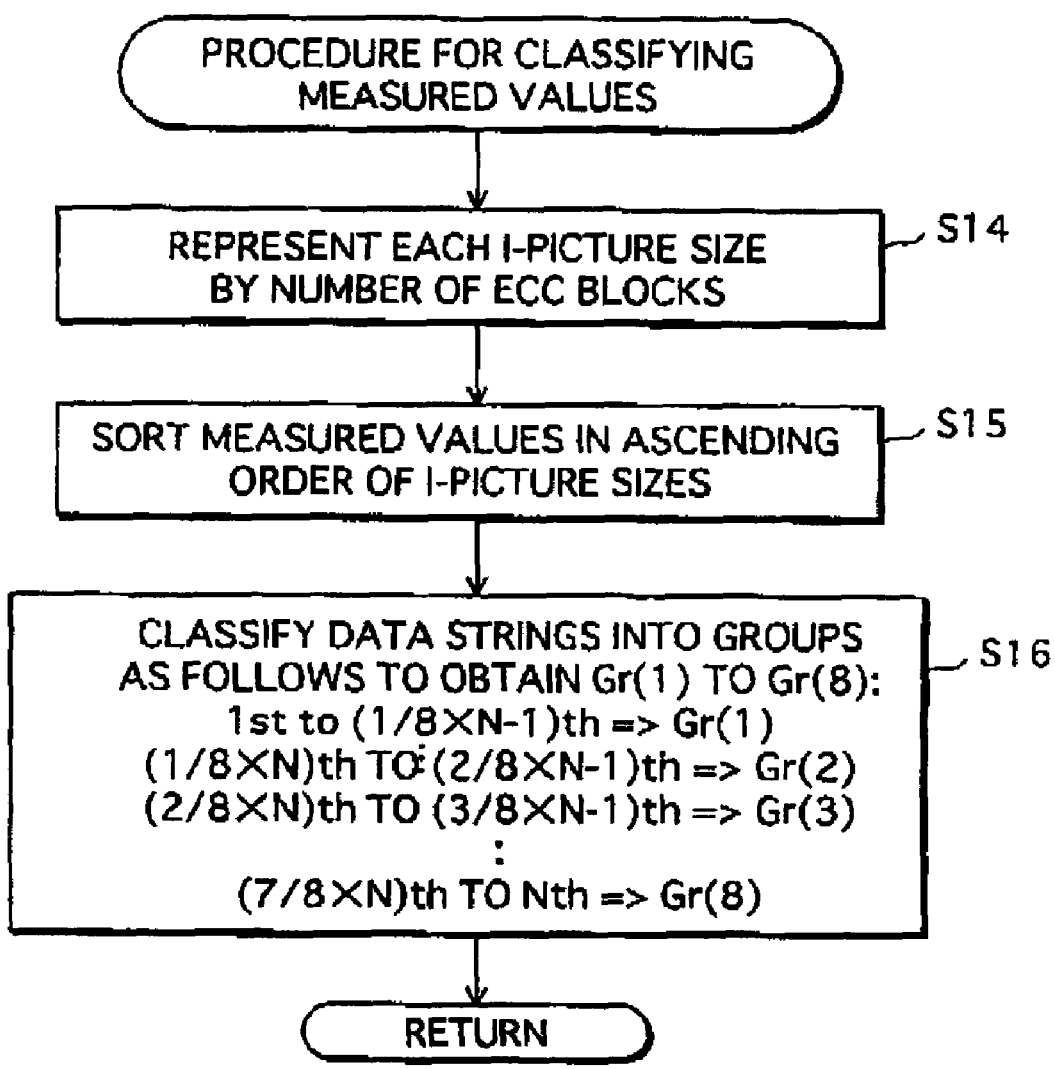
FIG. 15 shows a group classification procedure according to the fourth embodiment.

FIG. 15 is a flowchart showing the procedure for the classification according to the fourth embodiment.

In Step S14, each I-picture size is represented by the number of the ECC blocks. In Step S14, the measured values are sorted in ascending order of the numbers of the ECC blocks. By representing the I-picture size by the number of the ECC blocks, the sizes less than 64 K byte are to be omitted as fractions, and many picture sizes are to be classified one group.

In Step S16, the sorted measured values are classified into groups according to the following rule.

$1^{st}$ to $1/8 \times N-1^{th} \Rightarrow Gr(1)$ $1/8 \times N^{th}$ to $2/8 \times N-1^{th} \Rightarrow Gr(2)$
$2/8 \times N^{th}$ to $3/8 \times N-1^{th} \Rightarrow Gr(3)$ $3/8 \times N^{th}$ to $4/8 \times N-1^{th} \Rightarrow Gr(4)$
$4/8 \times N^{th}$ to $5/8 \times N-1^{th} \Rightarrow Gr(5)$ $5/8 \times N^{th}$ to $6/8 \times N-1^{th} \Rightarrow Gr(6)$
$6/8 \times N^{th}$ to $7/8 \times N-1^{th} \Rightarrow Gr(7)$ $7/8 \times N^{th}$ to $N^{th} \times \Rightarrow Gr(8)$ As a result, the eight groups, namely Gr(1) to Gr(8), are obtained.

In the first embodiment, the measured values are classified into seven groups. However, in the fourth embodiment, they are classified into eight groups. Therefore, the I_end uses eight values, namely "000b" to "111b" to represent the I-picture size. In the following embodiments, the descriptions are based on the fact that the measured values are classified into eight groups.

Figures 16A, 16B:
FIG. 16A shows a relation between a number of ECC blocks representing an I-picture size and a number of I-pictures having the I-picture size.
FIG. 16B shows a result of a group classification performed in Step S16 in FIG. 15.

FIG. 16A shows the number of ECC blocks representing the I-picture size and occurrence rates of the I-pictures having the size in relation to each other. FIG. 16B shows the result of the group classification performed in Step S16 in FIG. 15.

The I-pictures including eight to eleven ECC blocks frequently occur. Therefore, the measured values represented by "the number of the ECC blocks=8", "the number of the ECC blocks=9", "the number of the ECC blocks=10" and "the number of the ECC blocks=11" are classified into Gr(2), Gr(3), Gr(4) and Gr(5) respectively.

The I-pictures including twelve to thirteen ECC blocks and the I-pictures including fourteen to sixteen ECC blocks do not occur frequently. Therefore, the occurrence rates of the valued measures included in two to three ECC block groups are integrated together. The measured values represented by "the number of the ECC blocks=12 to 13" are classified into Gr(6), and the measured values represented by "the number of the ECC blocks=14 to 16" are classified into Gr(7).

The I-pictures including one to seven ECC blocks are not rare, and they are therefore classified into Gr(1). The I-pictures including seventeen to thirty-two ECC blocks are not rare as well, and they are therefore classified into Gr(8). The total number of occurrences is at the same level in each group.

Each I-picture size is represented by the number of the ECC blocks, and many measured values have the same I-picture size. Therefore, in this embodiment, the measured values are classified into groups so that the total number of occurrences in each group becomes almost at the same level. For instance, the total numbers of occurrences are 992, 743, 790, 865, 829, 1268, 996 and 704 respectively.

As described above, the fractions of the ECC block sizes less than one ECC block is not required to be considered in the fourth embodiment, and the measured values can be processed immediately.

The Fifth Embodiment

In the first to fourth embodiments, the classification is performed based on the I-picture size. However, in the fifth embodiment, the range that the I-picture size covers in the coordinate system that shows the occurrence distribution is equally divided into groups. FIG. 17A shows the coordinate system showing the occurrence distribution. The vertical axis represents the occurrence rates of the I-pictures, and the horizontal axis represents the I-picture sizes by the numbers of the ECC blocks. The I-picture sizes represented by the horizontal axis indicate up to thirty-two ECC blocks.

In the fifth embodiment, such a range of the I-picture sizes are equally divided into groups. The sign "<–>" in FIG. 17A shows how the range of the I-picture sizes is divided. As shown in FIG. 17A, the number of ECC blocks 1 to 4 are classified into Gr(1), 5 to 8 are classified into Gr(2), 9 to 12 are classified into Gr(3), 13 to 16 are classified into Gr(4), 17 to 20 are classified into Gr(5), 21 to 24 are classified into Gr(6), 25 to 28 are classified into Gr(7), and 29 to 32 are classified into Gr(8). As a result of such a classification, the measured values shown in FIG. 17A are divided into eight groups as shown in FIG. 17B.

Note that as the I-picture sizes are divided into groups so that the numbers of the ECC blocks are distributed equally, the fifth embodiment is disadvantageous in that the resolution within the range in which the occurrence rate is high is decreased.

The Sixth Embodiment

The sixth embodiment is an improvement upon the fifth embodiment. How to handle the singularities on the horizontal axis is improved. Extremely large picture sizes are sometimes found in the measured values, and such picture sizes are called singularities.

FIG. 18 is a coordinate system showing the occurrence distribution, just as FIG. 17. The I-picture including twenty-seven ECC blocks and the I-picture including thirty ECC blocks respectively correspond to original images that are hard to be compressed. These large sizes are probably due to low compression efficiency. Usually, such large sizes rarely occur. Therefore, these singularities are separated from others at the time of the classification. In FIG. 18, for instance, the I-pictures whose sizes are twenty-five or more ECC blocks are separated from others. Reading of such large I-pictures usually requires a lot of time at the time of the continuous playback. It is highly possible that they are not suitable for the high-speed playback. A smooth high-speed playback can be realized by skipping such I-pictures at the time of the high-speed playback.

In the example shown in FIG. 18A, the I-pictures including twenty-five or more ECC blocks are ruled out as the singularities, and classified into one group. Then, the other I-picture sizes are classified into seven groups. FIG. 18B is an example classification with consideration of the singularities. As shown in FIG. 18B, the number of ECC blocks 1 to 7 are classified into Gr(1), 8 to 9 are classified into Gr(2), 10 is classified into Gr(3), 11 is classified into Gr(4), 12 to 13 are classified into Gr(5), 14 to 15 are classified into Gr(6), and 16 to 24 are classified into Gr(7). The singularities including twenty-five or more ECC blocks are classified into Gr(8). As a result of such a classification, the measured values shown in FIG. 18A are divided into eight groups as shown in FIG. 18B.

The singularities to be skipped at the time of the high-speed playback are classified into Gr(8), and therefore the fluctuation band between Gr(1) to Gr(7) becomes narrow.

As described above, the I-picture sizes are equally assigned to the 3-bit values.

Note that the singularities may be determined according to the reading performance of the drive, not to the occurrence rates. For instance, if the maximum bit rate is 40 Mbps, the size of one picture can not be 5 Mbytes, which is data for one second. Therefore, the size "5 Mbytes" may be used as the threshold.

The Seventh Embodiment

The seventh embodiment discloses an improvement of the classification of the range that the I-picture size covers. In the fifth embodiment, the I-picture sizes are equally divided into groups. However, in the seventh embodiment, the I-picture sizes are divided so that large I-picture sizes are classified into more groups. In other words, in the fifth embodiment, the range that the I-picture sizes cover is equally divided into groups each including a certain number of ECC blocks, but in the seventh embodiment, the range is unequally divided, which means that the smaller the I-picture sizes become, the wider the range of the group becomes, and the larger the I-picture sizes become, the narrower the range of the group becomes.

Figures 19A, 19B, 19C:
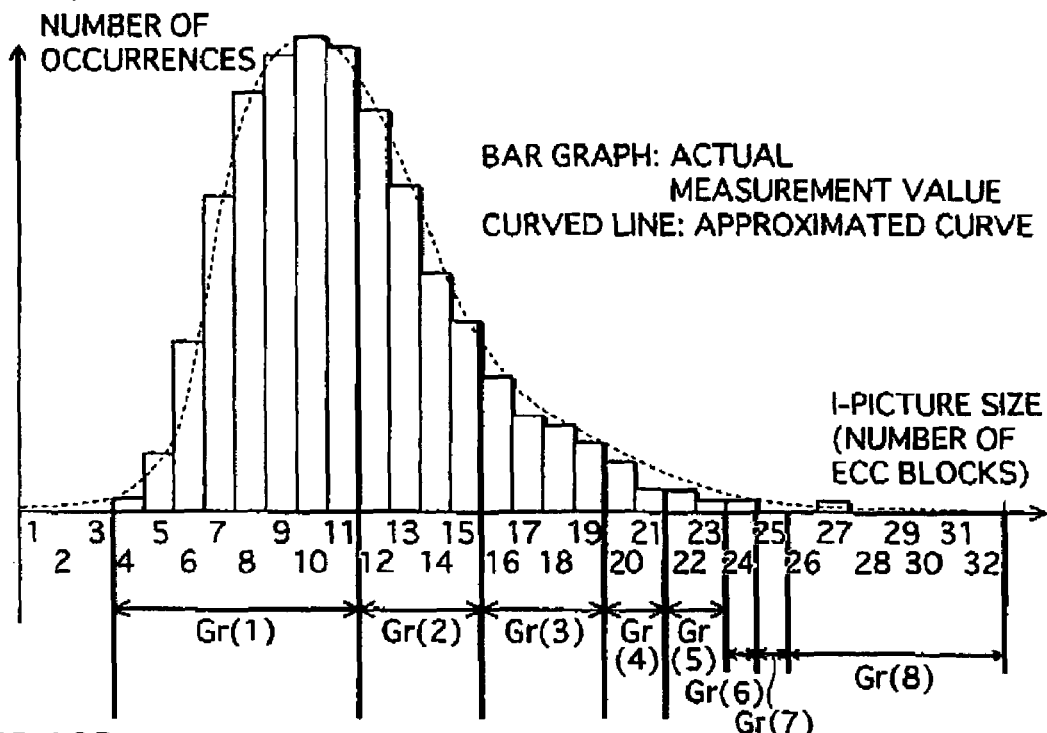
FIG. 19A shows how a range of an I-picture size is classified.
FIG. 19B shows a correlation among ranges of groups.
FIG. 19C shows that the measured values distributed as FIG. 19A shows are classified into eight groups.

FIG. 19A shows how the range of the I-picture sizes is classified. As FIG. 19A shows, the number of ECC blocks 4 to 11 are classified into Gr(1), 12 to 15 are classified into Gr(2), 16 to 19 are classified into Gr(3), 20 to 21 are classified into Gr(4), 22 to 23 are classified into Gr(5), 24 is classified into Gr(6), 25 is classified into Gr(7), and 26 is classified into Gr(8). FIG. 19B shows the correlation among the ranges of the groups. As shown in FIG. 19B, the range of Gr(2) is 1/2 of the range of Gr(1), and the range of Gr(3) is also 1/2 of the range of Gr(1). The range of Gr(4) is 1/4 of the range of Gr(1), the range of Gr(5) is 1/4 of the range of Gr(1), the range of Gr(6) is 1/8 of the range of Gr(1), and the range of Gr(7) is 1/8 of the range of Gr(1). As a result of such a classification, the measured values are classified into eight groups as shown in FIG. 19C.

The range of the group is narrow where the I-picture sizes included in the group are large. Therefore, the larger the I-picture size becomes, the error between the reading amount of the data and the actual I-picture size becomes smaller. This improves the efficiency in the reading of the I-pictures.

As described above, the seventh embodiment can improve the efficiency in the reading of the I-pictures by classifying large I-pictures into more groups than small I-pictures.

The Eighth Embodiment

In the eighth embodiment, a plurality of classification patterns, which are used for classifying the measured values into eight groups, are generated, and the most suitable one out of the patterns is to be selected.

Figure 20:
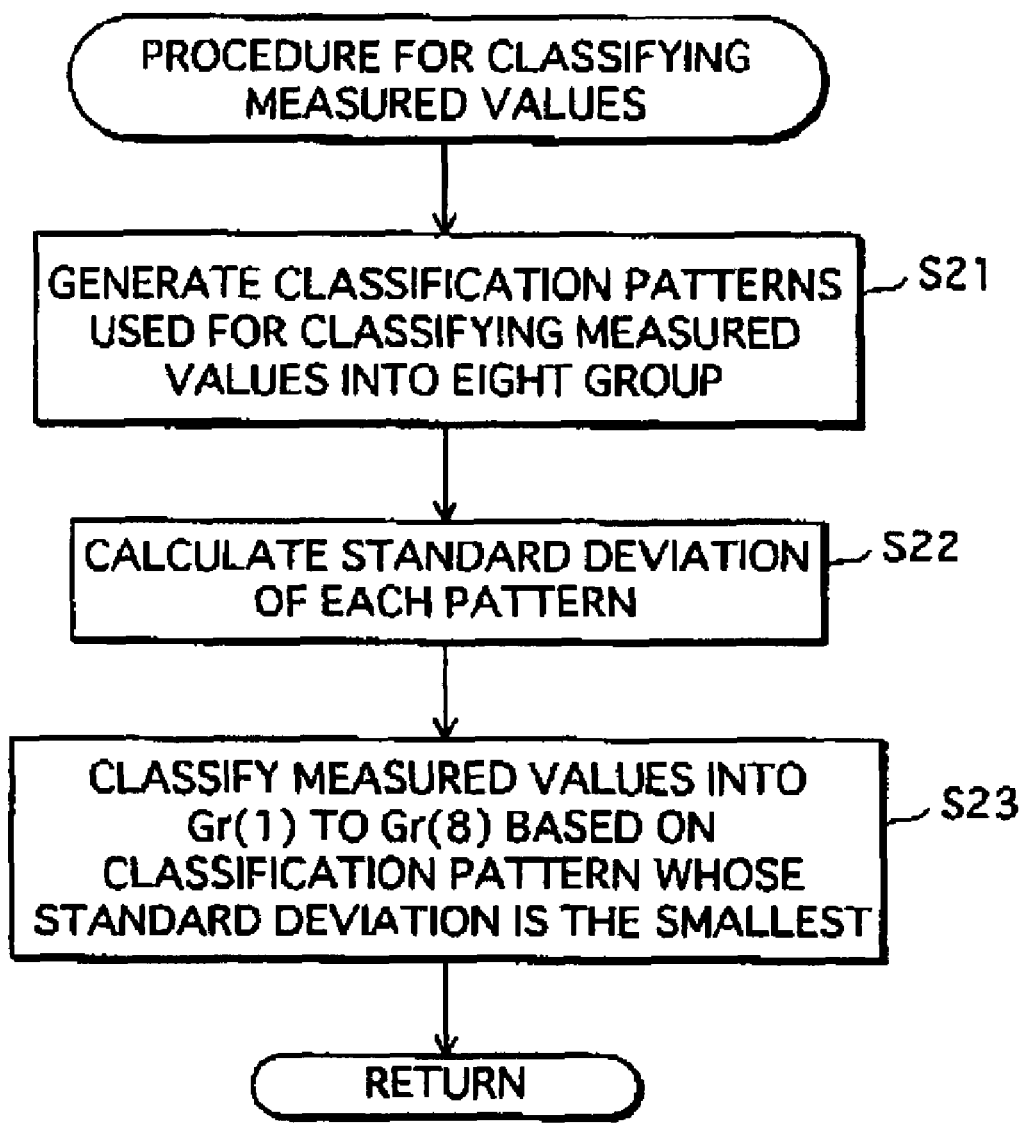
FIG. 20 is a flowchart showing a procedure for classifying measured values.

FIG. 20 is a flowchart according to the eighth embodiment, showing a procedure for classifying the measured values. In this flowchart, the plurality of the classification patterns, which are used for classifying the measured values into seven groups, are firstly generated (Step S21). Then, a standard deviation of each pattern is calculated (Step S22) and the measured values are classified into Gr(1) to Gr(8) based on the pattern whose standard deviation is the smallest (Step S23). The details of the procedure represented by the flowchart are described next with reference to specific examples shown in FIG. 21.

FIG. 21 shows two example patterns among the plurality of the classification patterns generated in Step S21. The upper pattern 1 is generated in the same manner as the third embodiment. The lower pattern 2 is generated in the same manner as the fifth embodiment.

The standard deviation of each pattern is calculated. In this case, the standard deviation of the upper pattern 1 is 183.03, and the standard deviation of the lower pattern 2 is 1157.8. The pattern whose standard deviation is the smallest is to be selected. Between the examples in FIG. 21, the pattern 1 is to be selected. Then the measured values are classified into eight groups based on the selected pattern.

As described above, the plurality of the classification patterns, which are used for classifying the measured values into eight groups, are generated in the eighth embodiment, and the measured values are classified on the basis of the classification pattern whose standard deviation is the smallest. Therefore, almost the same numbers of the measured values are to be included in each group. Accordingly, the reading amount can be properly determined based on the 3-bit value. Also, it becomes possible to maintain the high resolution within a range where the occurrence rate is high.

Note that in the case where the standard deviation is the same among the classification patterns, the pattern in which the larger I-picture sizes are classified into more groups may be preferentially selected. To the contrary, the pattern in which the smaller I-picture sizes are classified into more groups maybe preferentially selected.

The Ninth Embodiment

The ninth embodiment relates to an improvement in which a speed rate of the playback device 300 is assigned to each digit of the 3-bit value representing the I-picture size. FIG. 22 shows examples of the assigned speed rates. The values representing the I_end, such as 001b, 010b, 011b, 100b, 101b, 110b, and 111b are assigned to the speed rates, such as ×16, ×8, ×6, ×4, ×3, ×2, and ×1.

Figure 23:
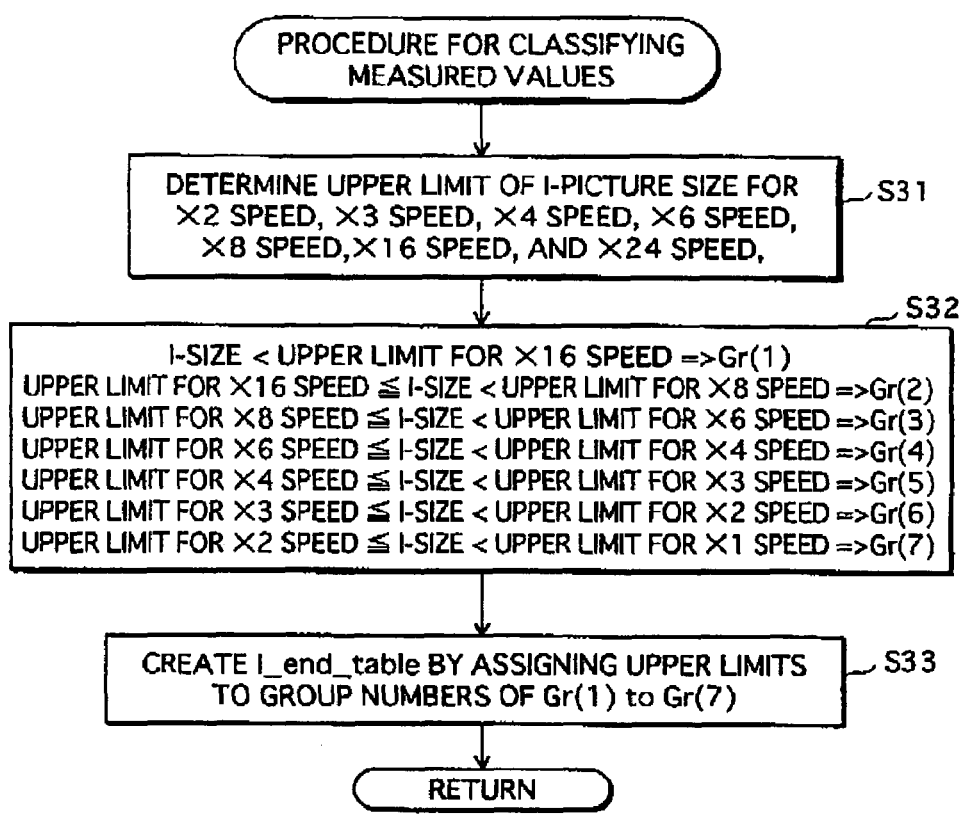
FIG. 23 shows a procedure for classifying measured values according to the eighth embodiment.

To realize such an assignment, the analysis unit 6 in the ninth embodiment performs classification of the measured values according to the procedure shown in FIG. 23.

In step S31, the upper limit of the I-picture size for each speed rate is determined. Here, the upper limit is determined according to a rule that the larger the speed rate is, the smaller the I-picture is, and the smaller the speed rate is, the larger the I-picture size is.

For instance, in Step S32, the measured values are classified into the following groups based on the upper limits for each speed rate:

The measured values that satisfy I-picture size<the upper limit for ×16 speed=>Gr(1).
The measured values that satisfy I-picture size<the upper limit for ×8 speed=>Gr(2).
The measured values that satisfy I-picture size<the upper limit for ×6 speed=>Gr(3).
The measured values that satisfy I-picture size<the upper limit for ×4 speed=>Gr(4).
The measured values that satisfy I-picture size<the upper limit for ×3 speed=>Gr(5).
The measured values that satisfy I-picture size<the upper limit for ×2 speed=>Gr(6).
The measured values that satisfy I-picture size<the upper limit for ×1 speed=>Gr(7).

Finally, in Step S33, the I_end_table is created by assigning the upper limits for the speed rates to 3-bit values that represent Gr(1) to Gr(7).

The improvement of the recording device 200 according to the ninth embodiment is described above. The improvement of the playback device 300 according to the ninth embodiment is described next.

Upon receiving a request for performing playback at a certain speed rate from the user, the playback device 300 identifies the 3-bit value corresponding to the requested speed rate. The playback device 300 refers to only the entry having a value more than the identified 3-bit value, in order to read only the I-picture corresponding to the entry from the recording medium.

For instance, for performing ×4 speed playback, the playback device 300 refers to the entry whose I_end is "100b", and reads only the I-picture corresponding to the entry. Then, the playback device 300 reads other entries corresponding to higher speed rates, namely the entries whose I_ends are "011b" (×6 speed), "010b" (×8 speed) and "001b" (×16 speed) respectively, and reads the I-pictures corresponding to those entries from the recording medium.

As described above, when the high-speed playback is requested from the user, the playback device 300 can read a suitable number of the I-pictures from the recording medium only by reading I-pictures whose sizes are described in the entries corresponding to the speed rate specified by the user. Therefore, the playback device 300 can realize the high-speed playback of suitable quality even if the drive unit is low-speed.

The Tenth Embodiment

In the seventh embodiment, the range that the I-picture sizes cover is unequally divided into groups so that compared to the width of Gr(1) as a criterion, the larger the I-picture sizes become, the narrower the range of the group becomes. In the tenth embodiment, the range of the group is narrowed by focusing attention on the number of the I-pictures to be included in one group.

For dividing the range based on the number of the I-pictures, the measured values are sorted in ascending order of the I-picture sizes just as shown in the first embodiment. The sorted measured values are classified into groups as follows:
$1^{st}$ to $1/2 \times N-1^{th}$=>Gr(1) $1/2 \times N^{th}$ to $3/4 \times N-1^{th}$=>Gr(2) $3/4 \times N^{th}$ to $7/8 \times N-1^{th}$=>Gr(3) $7/8 \times N^{th}$ to $15/16 \times N-1^{th}$=>Gr(4) $15/16 \times N^{th}$ to $31/32 \times N-1^{th}$=>Gr(5) $31/32 \times N^{th}$ to $63/64 \times N-1^{th}$=>Gr(6) $63/64 \times N^{th}$ to $127/128 \times N-1^{th}$=>Gr(7) $127/128 \times N^{th}$ to $N^{th}$->Gr(8)

Figure 24:
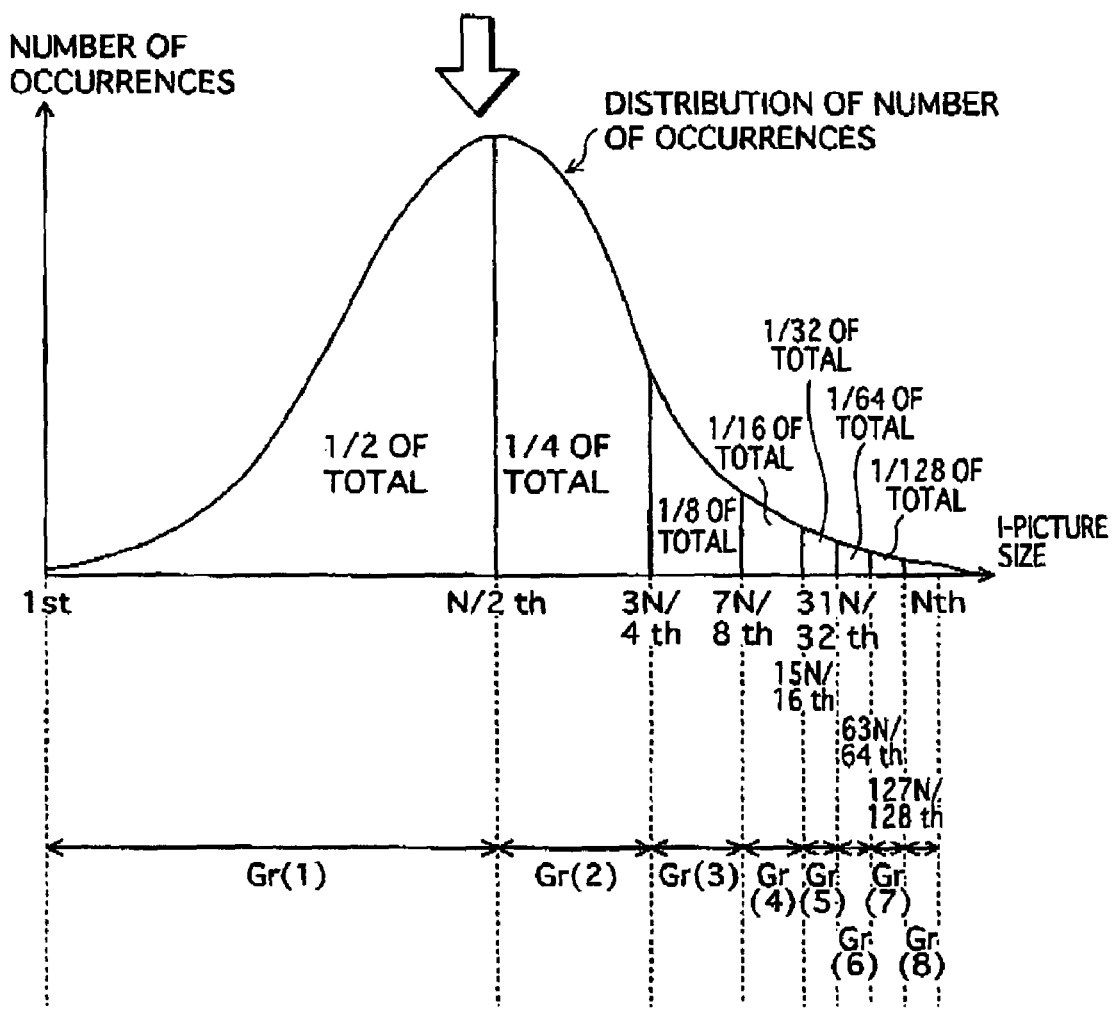
FIG. 24 describes a function of the classification performed in the tenth embodiment.

FIG. 24 describes the function of the classification performed in the tenth embodiment.

The $1^{st}$ to $1/2 \times N-1^{th}$ values are classified into Gr(1), which means that 1/2 of the measured values are classified into Gr(1).

The $1/2 \times N^{th}$ to $3/4 \times N-1^{th}$ values are classified into Gr(2), which means that 1/4 of the measured values are classified into Gr(2).

The $3/4 \times N^{th}$ to $7/8 \times N-1^{th}$ values are classified into Gr(3), which means that 1/8 of the measured values are classified into Gr(3).

The $7/8 \times N^{th}$ to $15/16 \times N-1^{th}$ values are classified into Gr(4), which means that 1/16 of the measured values are classified into Gr(4).

The $15/16 \times N^{th}$ to $31/32 \times N-1^{th}$ values are classified into Gr(5), which means that 1/32 of the measured values are classified into Gr(5).

The $31/32 \times N^{th}$ to $63/64 \times N-1^{th}$ values are classified into Gr(6), which means that 1/64 of the measured values are classified into Gr(6).

The $63/64 \times N^{th}$ to $127/128 \times N-1^{th}$ values are classified into Gr(7), which means that 1/128 of the measured values are classified into Gr(7).

The $127/128 \times N^{th}$ to $N^{th}$ values are classified into Gr(8), which means that the rest of the measured values are classified into Gr(8).

The number of the measured values included in Gr(1) to Gr(8) decreases as the I-picture size increases, i.e. $1/2 \rightarrow 1/4 \rightarrow 1/8 \rightarrow 1/32 \rightarrow 1/64 \rightarrow 1/128$.

As described above, according to the tenth embodiment, the resolution of the I_end_table for the large I-pictures is improved, and therefore the response at the time of the special playbacks is improved.

Remarks

The above description by no means shows the implementation of all configurations of the present invention. Implementation of the present invention is still possible according to implementation of configurations that carry out the following modifications (A), (B), (C), (D), . . . . The inventions pertaining to the claims of the present application range from expanded disclosure to generalized disclosure of the plurality of embodiments disclosed above and the modified configurations thereof. The degree of expansion or generalization is based on the particular characteristics of technical standards in the technical field of the present invention at the time of application.

(A) Although the I-picture size is represented by the number of the ECC blocks in each embodiment, it may be represented by the number of sectors (each sector is 2 k byte in the case of the BD-ROM), or the number of packets included in the transport stream (each packet is 192 bytes in the case of the BD-ROM). Furthermore, the I-picture size may be represented by units of 192 bytes including Arrival Time Stamp and TS packets, or by units of 32 Kbytes, which is the least common multiple between 192 bytes and 2 Kbytes.

(B) It is the size of the I-picture that is described in EP_map in each embodiment. However, the I-picture is described as just an example of the random access unit. (It is possible to display an image by decoding only the random access unit.) The size of the random access unit used in a method other than the MPEG2-video may be described in the EP_map. For instance, the size of the IDR picture used in the MPEG4-AVC (also called H.264 or JVT) may be described.

(C) It is acceptable to include bit rate information in the Clip information and determine the meaning of the value of the I_end based on the bit rate information. For instance, it is possible to predefine I_end table for the case where the average bit rate is 10 Mbps, and use the value described in the I_end table multiplied by 1.5 as the I_end if the average bit rate of the AVClip is 15 Mbps. In stead of the average bit rate, the maximum bit rate may be used in the same way.

(D) Only the size factors that will be the upper limits of the size if the value of the I_end is valid (0, 2, 4, 6, 9, 14 and 20 in FIG. 3) ma be described in the I_end_table.

(E) Although he I_picture size is represented by the number of the ECC blocks in each embodiment, it maybe represented by the number of intersections of the ECC blocks. The number of the intersections of the ECC blocks represents across how many ECC blocks the I-picture is recorded. The number of the intersections can be a very useful reference value for reading data from the disc.

(F) The I-picture sizes may be classified based on proper values, such as ECC block sizes, the number of occurrences of each ECC block size maybe measured, and the sizes frequently occurs may be classified into groups so that the resolution will be high, and the sizes not frequently occur may be classified together into one group. It may depend on the bit width of the I_end that how many groups the sizes are classified into. Also, weighting may be performed on the number of the occurrences of each ECC block size.

(G) Although the recording device 200 and the playback device 300 are described as independent from each other in each embodiment, the recording device 200 and the playback device 300 may be an integrated recording/playback device.

(H) The EP_map is navigation information defined in the BD-RE standard and the BD-ROM standard. The data structure of the group of the entries is described in each embodiment in accordance with the BD-RE standard and the BD-ROM standard. However, the recording medium used by the recording device 200 and the playback device 300 is not limited to optical disc, such as the BD-RE and the BD-ROM. The recording medium may be any medium on which the video stream can be recorded in accordance with the BD-RE standard or the BD-ROM standard. The recording device 200 does not record video stream on the BD-ROM directly, which means that the master BD-ROM disc is created by forming an application format in accordance with the BD-ROM standard on the hard disk. The BD-ROM is manufactured using the master BD-ROM disc. From the point of view of such a manufacturing method, it is possible to consider the hard disk as the recording medium on which the recording device 200 records the EP_map, and it is reasonable to consider the BD-ROM as the recording medium which is played back by the playback device 300.

(I) Although the playback device 300 in all of the embodiments output AVClips recorded on a BD-ROM to a TV after decoding, the playback device 300 may be structured from only a BD-ROM drive, and the TV may be equipped with all of the other elements. In this case, the playback device 300 and the TV can be incorporated into a home network connected using IEEE1394. Also, although the playback device 300 in the embodiments is of a type used after connecting to a television, integral display-playback devices are also applicable. Furthermore, the playback device 300 may be only those parts of the playback devices of the embodiments that perform essential parts of the processing. Because these playback devices are all inventions disclosed in the specification of the present application, acts involving the manufacture of playback devices based on an internal structure of the playback device 300 shown in embodiment 6 are implementations of the inventions disclosed in the specification of the present application.

(J) Because of the information processing by computer programs shown in the flowcharts being realized specifically using hardware resources, computer programs showing the processing procedures in the flowcharts form an invention in their own right. Although all of the embodiments show embodiments that relate to the implementation of computer programs pertaining to the present invention in an incorporated form in the playback device 300, the computer programs shown in the first embodiment may be implemented in their own right, separate from the playback device 300.

(K) Consider that the clement of "time" relating to the steps executed in time-series in the flowcharts is a required item for specifying the invention. If this is the case, then the processing procedures shown by the flowcharts can be understood as disclosing the usage configurations of the playback method. Execution of the processing in the flowcharts so as to achieve the original objects of the present invention and to enact the actions and effects by performing the processing of the steps in time-series is, needless to say, an implementation of the recording method pertaining to the present invention.

(L) Although digital streams recorded on a recording medium in the embodiments are AVClips, the digital streams may be VOBs (Video Objects) complying with a DVD-Video standard or a DVD-Video Recording standard. VOBs are program streams compliant with ISO/IEC13818-1 obtained by multiplexing video and audio streams. Also, video streams in AVClips may be MPEG-4 format, WMV format, or the like. Furthermore, audio streams may be a Linear-PCM format, Dolby-AC3 format, MP3 format, MPEG-AAC format, or Dts format.

(M) Movie works in the embodiments may be obtained by encoding analog video signals broadcast by analog broadcast, or may be stream data constituted from transport streams broadcast by digital broadcast.

Also, contents may be obtained by encoding analog/digital video signals recorded on videotape. Furthermore, contents may be obtained by encoding analog/digital video signals taken directly from a video camera. Alternatively, the contents may be digital copyrighted works distributed from a distribution server.

(N) The I_end_table may be defined not only in the EP_map, but also in other management information.

(O) Although the measured values are sorted in ascending order of the sizes and classified into N groups in the first embodiment, the measured values may be sorted in descending order of the seizes to obtain measured data strings, and classified into N groups.

(P) Although, in each embodiment, the information indicating the assignment of the 3-bit data and the number of the ECC blocks is recorded on the recording medium 100 as the I_end_table in a table format, other format may be used as long as the information indicating the assignment. For instance, the information may be a correlation equation between the 3-bit data and the number of the ECC blocks, or an offset.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A recording device that records a video stream onto a recording medium, comprising:
    a detecting unit operable to detect sizes of Intra pictures included in the digital stream and output detected values including the Intra picture sizes;
    a classifying unit operable to classify the detected values into N groups, wherein the classifying unit comprises:
        a generating sub-unit operable to generate classification patterns used for classifying the detected values into N groups; and
        a calculating sub-unit operable to calculate a standard deviation of each classification pattern, and
        the classification by the classifying unit is performed based on one of the classification patterns with a smallest standard deviation;
    an assigning unit operable to generate assignment information which indicates distribution ranges of Intra picture sizes respectively belonging to the N groups in a one-to-one association with numerical values 1 to N respectively representing the N groups; and
    a recording unit operable to record an entry map onto the recording medium in association with the assignment information, the entry map representing each Intra picture included in the digital stream using the numerical values 1 to N.

2. The recording device of claim 1,
    wherein the recording unit records the assignment information onto the recording medium after adding an identifier to the assignment information, and records the entry map onto the recording medium after adding a reference value used for referring to the identifier to the entry map.

3. The recording device of claim 1,
    wherein the recording unit records the assignment information onto the recording medium after adding information indicating an encoding method used for encoding the digital stream to the assignment information.

4. A recording device that records a video stream onto a recording medium, comprising:
    a detecting unit operable to detect sizes of Intra pictures included in the digital stream and output detected values including the Intra picture sizes;
    a classifying unit operable to classify the detected values into N groups, wherein the classification by the classifying unit is performed by dividing horizontal axis of a coordinate system into N ranges, the horizontal axis and a vertical axis of the coordinate system representing the Intra picture sizes and numbers of occurrences thereof respectively;
    an assigning unit operable to generate assignment information which indicates distribution ranges of Intra picture sizes respectively belonging to the N groups in a one-to-one association with numerical values 1 to N respectively representing the N groups; and
    a recording unit operable to record an entry map onto the recording medium in association with the assignment information, the entry map representing each Intra picture included in the digital stream using the numerical values 1 to N.

5. The recording device of claim 4,
    wherein the horizontal axis is equally divided into N ranges.

6. The recording device of claim 4,
wherein the horizontal axis is divided so that widths of the ranges decrease as the Intra picture sizes increase.

7. A recording device that records a video stream onto a recording medium, comprising:
- a detecting unit operable to detect sizes of Intra pictures included in the digital stream and output detected values including the Intra picture sizes;
- a classifying unit operable to classify the detected values into N groups;
- an assigning unit operable to generate assignment information which indicates distribution ranges of Intra picture sizes respectively belonging to the N groups in a one-to-one association with numerical values 1 to N respectively representing the N groups; and
- a recording unit operable to record an entry map onto the recording medium in association with the assignment information, the entry map representing each Intra picture included in the digital stream using the numerical values 1 to N,
wherein each of the numerical values 1 to N corresponds to a speed rate during a high-speed playback, and
each of the amounts of data to be read means an amount of data to be read during the high-speed playback.

8. The recording device of claim 7,
wherein the recording unit records the assignment information onto the recording medium after adding an identifier to the assignment information, and records the entry map onto the recording medium after adding a reference value used for referring to the identifier to the entry map.

9. The recording device of claim 7,
wherein the recording unit records the assignment information onto the recording medium after adding information indicating an encoding method used for encoding the digital stream to the assignment information.

10. A recording device that records a video stream onto a recording medium, comprising:
- a detecting unit operable to detect sizes of Intra pictures included in the digital stream and output detected values including the Intra picture sizes;
- a classifying unit operable to classify the detected values into N groups;
- an assigning unit operable to generate assignment information which indicates distribution ranges of Intra picture sizes respectively belonging to the N groups in a one-to-one association with numerical values 1 to N respectively representing the N groups; and
- a recording unit operable to record an entry map onto the recording medium in association with the assignment information, the entry map representing each Intra picture included in the digital stream using the numerical values 1 to N,
wherein the recording unit records the assignment information onto the recording medium after adding an identifier to the assignment information, and records the entry map onto the recording medium after adding a reference value used for referring to the identifier to the entry map.

11. A recording device that records a video stream onto a recording medium, comprising:
- a detecting unit operable to detect sizes of Intra pictures included in the digital stream and output detected values including the Intra picture sizes;
- a classifying unit operable to classify the detected values into N groups;
- an assigning unit operable to generate assignment information which indicates distribution ranges of Intra picture sizes respectively belonging to the N groups in a one-to-one association with numerical values 1 to N respectively representing the N groups; and
- a recording unit operable to record an entry map onto the recording medium in association with the assignment information, the entry map representing each Intra picture included in the digital stream using the numerical values 1 to N,
wherein the recording unit records the assignment information onto the recording medium after adding information indicating an encoding method used for encoding the digital stream to the assignment information.

12. A playback device comprising:
a reading unit operable to read assignment information and an entry map including entries, both corresponding to a digital stream to be played back, from a recording medium to a memory, the assignment information indicating distribution ranges of Intra picture sizes in one-to-one association with numerical values 1 to N;
a converting unit operable to respectively convert, based on the assignment information, values each having a predetermined bit width described in each entry into the distribution ranges; and
a playback unit operable to read Intra pictures included in the digital stream based on the distribution ranges,
wherein the assignment information is one of pieces of assignment information recorded on the recording medium, each piece of assignment information having an identifier,
the entry map includes reference values each used for referring to the identifier,
the reading unit reads the assignment information that corresponds to the reference value, and
the conversion by the converting unit is performed based on the read assignment information.

13. A playback device comprising:
a reading unit operable to read assignment information and an entry map including entries, both corresponding to a digital stream to be played back, from a recording medium to a memory, the assignment information indicating distribution ranges of Intra picture sizes in one-to-one association with numerical values 1 to N;
a converting unit operable to respectively convert, based on the assignment information, values each having a predetermined bit width described in each entry into the distribution ranges; and
a playback unit operable to read Intra pictures included in the digital stream based on the distribution ranges,
wherein the assignment information is one of pieces of assignment information recorded on the recording medium, each piece of assignment information including information indicating an encoding method used for encoding the digital stream corresponding to the assignment information,
the reading unit reads the assignment information that corresponds to the encoding method, and
the conversion by the conversion unit is performed based on the read assignment information.

14. A playback device, comprising:
a reading unit operable to read assignment information and an entry map including entries, both corresponding to a digital stream to be played back, from a recording medium to a memory, the assignment information indicating distribution ranges of Intra picture sizes in one-to-one association with numerical values 1 to N;

a converting unit operable to respectively convert, based on the assignment information, values each having a predetermined bit width described in each entry into the distribution ranges; and a playback unit operable to read Intra pictures included in the digital stream based on the distribution ranges, wherein if a high-speed playback at a certain speed rate is requested by a user, the converting unit identifies an entry corresponding to the certain speed rate among entries included in the entry map, and converts a value described in the identified entry into an amount of data to be read.

* * * * *